United States Patent
Zhang

(10) Patent No.: US 10,830,713 B2
(45) Date of Patent: Nov. 10, 2020

(54) SYSTEM AND METHODS FOR COMPUTING PHYSICAL PROPERTIES OF MATERIALS USING IMAGING DATA

(71) Applicant: DigiM Solution LLC, Winchester, MA (US)

(72) Inventor: ShuAng Zhang, Winchester, MA (US)

(73) Assignee: DigiM Solution LLC, Winchester, MA (US)

( * ) Notice: Subject to any disclaimer, the term of this patent is extended or adjusted under 35 U.S.C. 154(b) by 11 days.

(21) Appl. No.: 16/196,783

(22) Filed: Nov. 20, 2018

(65) Prior Publication Data

US 2019/0154597 A1    May 23, 2019

Related U.S. Application Data

(60) Provisional application No. 62/588,642, filed on Nov. 20, 2017.

(51) Int. Cl.
*G06K 9/00* (2006.01)
*G01N 23/046* (2018.01)
(Continued)

(52) U.S. Cl.
CPC ......... *G01N 23/046* (2013.01); *G01N 15/088* (2013.01); *G01N 23/2251* (2013.01);
(Continued)

(58) Field of Classification Search
CPC ......... G01N 15/088; G01N 2015/0846; G01N 2223/071; G01N 2223/401; G01N 23/046;
(Continued)

(56) References Cited

U.S. PATENT DOCUMENTS 2,345,935 A    4/1944    Hassler
4,506,542 A    3/1985    Rose
(Continued)

OTHER PUBLICATIONS

Ahrenholz et al., Prediction of capillary hysteresis in a porous material using lattice-Boltzmann methods and comparison to experimental data and a morphological pore network model, Advances in Water Resources, vol. 31, 2008; pp. 1151-1173.
(Continued)

*Primary Examiner* — Charlotte M Baker
(74) *Attorney, Agent, or Firm* — Hamilton, Brook, Smith & Reynolds, P.C.

(57) ABSTRACT

A method for computing physical properties of materials, such as two-phase and three-phase relative permeabilities through a porous material, is described. The method employs single or multi-scale digital images of a representative sample which capture one or multiple fractionations of a micro-structure size cascade at the respective, required imaging resolutions. At a high resolution, the method computes basic physical properties, such as absolute permeabilities with a numerical method such as computational fluid dynamics solving the Navier-Stokes equation, and capillary pressure with simulations solving Young-Laplace equation. Saturation states of multiple fluids are combined to derive capillary pressure relationships at low resolutions when necessary. Upscaled physical properties, such as upscaled relative permeabilities corresponding to the low resolutions, are subsequently computed using the composition of multiple permeable facies at corresponding upscaled saturations determined by upscaled capillary pressure, honoring upscaled governing laws of the physical property, such as Darcy's law.

19 Claims, 14 Drawing Sheets

(51) Int. Cl.
  *G01N 15/08* (2006.01)
  *G01N 23/2251* (2018.01)
(52) U.S. Cl.
  CPC .............. *G01N 2015/0846* (2013.01); *G01N 2223/071* (2013.01); *G01N 2223/401* (2013.01)
(58) Field of Classification Search
  CPC .. G01N 23/2251; G01N 33/241; E21B 49/00; D21F 11/14; D21F 11/145; D21F 11/006; C08L 5/04; A61L 27/18; A61L 27/34; A61L 27/443; A61L 27/46
  USPC .............. 382/109; 703/2, 10; 706/21, 929; 702/12, 11, 2; 73/38
  See application file for complete search history.

(56) References Cited

U.S. PATENT DOCUMENTS

| | | | |
|---|---|---|---|
| 8,377,499 | B2 | 2/2013 | Kleiner et al. |
| 8,389,044 | B2 | 3/2013 | Kleiner et al. |
| 8,628,568 | B2 | 1/2014 | Santos et al. |
| 8,637,111 | B2 | 1/2014 | Hsu et al. |
| 9,140,117 | B2 | 9/2015 | de Prisco |
| 9,183,326 | B2 | 11/2015 | de Prisco et al. |
| 9,201,026 | B2 * | 12/2015 | Walls .................... G01N 23/22 |
| 2017/0076062 | A1 | 3/2017 | Choi et al. |

OTHER PUBLICATIONS

Blunt et al., "Pore-scale imaging and modelling," Advances in Water Resources, vol. 51, 2013; pp. 197-216.
Bondino et al., Relative permeabilities from simulation in 3D rock models and equivalent pore networks: critical review and way forward, International Symposium of the Society of Core Analysts held in Aberdeen, Scotland, UK, Aug. 27-30, 2012; 13 pages.
Brissos et al., "The role of long-acting injectable antipsychotics in schizophrenia: a critical appraisal," herapeutic Advances in Psychopharmacology, 2014, vol. 4[5], pp. 198-219.
Byrnes, "Reservoir Characteristics of Low-Permeability Sandstones in the Rocky Mountains," The Mountain Geologist, vol. 34, No. 1, Jan. 1997; pp. 39-51, The Rocky Mountain Association of Geologists.
Zhang, S., L. Canter & M. D. Sonnenfeld. Capillary Fluid Dynamics within Unconventional Rocks Investigated by Scanning Electron Microscopy, AAPG Bulletin, vol. 101, No. 11, 2017, pp. 1759-1765.
Dacy, "Core Tests for Relative Permeability of Unconventional Gas Reservoirs, SPE 1235427," Core Laboratories N.V., SPE Annual Technical Conference and Exhibition, Florence, Italy, Sep. 19-22, 2010, 18 pages.
DigiM Porosimetry Validation Page. http://www.digimsolution.com/products/image-simulation/porosimetry/, visited May 7, 2018, 5 pages.
D'Souza, "A Review of In Vitro Drug Release Test Methods for Nano-Sized Dosage Forms," Advances in Pharmaceutics vol. 2014, Nov. 20, 2014, Article ID 304757, 13 pages.
Fan et al., "The Issues and Challenges Involved in IVRT for Semi-solid Formulations", Drug Delivery Technology, Oct. 2007, vol. 7, No. 9, pp. 62-66.
Green et al., "Review of immobilized antimicrobial agents and methods for testing," Biointerphases, vol. 6, Issue 4, Dec. 2011, pp. MR13-MR28.
Hilpert et al., "Pore-morphology-based simulation of drainage in totally welling porous media," Advances in Water Resources, 24(3-4), 2001, pp. 243-255.
Joekar-Niasar et al., "Analysis of Fundamentals of Two-Phase Flow in Porous Media Using Dynamic Pore-Network Models: A Review," Critical Reviews in Environmental Science and Technology, 42:18, Dec. 30, 2015; pp. 1895-1976, DOI: 10.1080/10643389.2011. 574101.
Landovitz et al., "The promise and Pitfalls of long-acting injectable agents for HIV prevention," Curr. Opin. HIV AIDS, 11(1), Jan. 2016, pp. 122-128.
Leu et al., "Fast X-ray Micro-Tomography of Multiphase Flow in Berea Sandstone: A Sensitivity Study on Image Processing," Transp. Porous Media 105, 2014, pp. 451-469. doi: 0.1007/s11242-014-0378-4.
Markt et al., A Review of Disintegration Mechanisms and Measurement Techniques, Pharm Res. 2017, 34(5), pp. 890-917.
Naar et al., "Three-Phase Imbibition Relative Permeability," Society of Petroleum Engineers Journal, Dec. 1961, 5 pages.
Putz et al., "Microscopy Supported Multi-scale Modeling of PEM Fuel Cells," Presentation at 231st Electrochemical Society Meeting, session F03:Multiscale Modeling, Simulation and Design, New Orleans, May 28-Jun. 1, 2017, 3 pages.
Saraf et al., Three-phase relative permeability measurement using a nuclear magnetic resonance technique for estimating fluid saturations, Society of Petroleum Engineers Journal, Sep. 1967). retrieved from the Internet at https://www.onepetro.org/journal-paper/SPE-1760-PA; 8 pages.
Shikhov et al., "Evaluation of Capillary Pressure Methods via Digital Rock Simulations," Transp Porous Media, vol. 107, 2015, pp. 623-640.
Siepmann et al., "Fundamentals and Applications of Controlled Release Drug Delivery," Springer, 2012. Ebook: https://www.springercom/gp/book/9781461408802.
Versteeg et al., "An introduction to computational fluid dynamics," The finite volume method (2 Edition). Pearson Education Limited, 2007, 577 pages.
Wu et al., "Microimaging Characterization and Release Prediction of Controlled Release Microspheres," 18-A-137-CRS. Controlled Release Society Annual Meeting and Exposition, New York City, New York, U.S.A. Jul. 22-24, 2018; 1 page.
Zhang et al., "Porosity and permeability analysis on nanoscale FIB-SEM tomography of shale rock," Society of Core Analysis 2011 Symposium, paper A080, Austin, Texas, Sep. 18-21, 2011, 12 pages.
Zhang et al., "Micron to millimeter upscale of shale rock properties based on three-dimensional imaging and modeling," Society of Core Analysis 2012 Meeting, paper A080, Aberdeen, UK, Aug. 26-31, 2012, 12 pages.
Zhang, "Artificial Intelligence Image Processing," DigiM Technology Highlight 2017, Jul. Issue, Jul. 29, 2017, 8 pages.
Zhang et al., "Quantitative Characterization of Crystallization in Amorphous Solid Dispersion Drug Tablets Using X-RayMicro-Computed Tomography," Microscopy & Microanalysis 2018, Baltimore, Maryland, Aug. 5-9, 2018, 2 pages.
Zhang et al., "Reconstruction of Three-Dimensional Micro-Structures From Two-Dimensional Microscopic Images Using Texture Synthesis and Phase Field Method," Poster ID PDP-54, date unknown.
Byrnes et al., "Effect of pressure and water saturation on the permeability of western tight sandstones," 1979, Proc. 5th Annual DOE Symposium Enhanced Oil and Gas Recovery, Aug. 22-26, Tulsa, OK, p. 231-246, L-5/1 to L-5/16.
Baxter, JL, Kukura J, Muzzio FJ. Hydrodynamics-induced variability in the USP apparatus II dissolution test. Int J Pharm 2005;292:17-28.
Byrnes et al., "Application of integrated core and 3D image rock physics to characterize Niobrara chalk properties including relative permeability with bound water effect," Unconventional Resources Technology Conference, URTeC 2670963, Austin, Texas, USA, Jul. 24-26, 2017.
Pancholi, "A review of imaging methods for measuring drug release at nanometre scale: a case for drug delivery systems," Expert Opinion on Drug Delivery. vol. 9, 2012, Issue 2.
Zhang et al., "DigiMedicine: FIB-SEM/MicroCT three-dimensional imaging for drug microstructure and deliverability characterization," AAPS National Biotechnology Conference 2016, 1 page.
Zhang et al., "Microscopic Image Based Drug Delivery System Characterization," AAPS 2016 Annual Conference, Poster #02W0900, Denver, CO, USA, Nov. 13-17, 2017.

(56) References Cited

OTHER PUBLICATIONS

Khalili et al, "Permeability Upscaling for Carbonates from the Pore-Scale Using Multi-Scale X-Ray-CT Images,", 2013, SPE Reserv. Eval. Eng. 16, 353-368. doi:10.2118/152640-MS.

Diez-Escudero, A., Espanol M, Montufar EB, Di Pompo G, Ciapetti G, Baldini N, Ginebra MP. Focus Ion Beam/Scanning Electron Microscopy Characterization of Osteoclastic Resorption of Calcium Phosphate Substrates. Tissue Eng Part C Methods. Feb. 2017;23(2):118-124. doi: 10.1089/ten.TEC.2016.0361. Epub Feb. 3, 2017.

Fenwick et al., "Network Modeling of Three-Phase Flow in Porous Media," SPE Journal, Mar. 1998, 12 pages.

Grimaldi-Bensouda, L. et al., Does long-acting injectable risperdone make a difference to the real life treatment of schizophrenia? Results of the cohort for the general study of Schizophrenia (CGS), Schizophrenia Research, 134 (2012) 187-194.

Hill, R. (1963), "Elastic properties of reinforced solids: some theoretical principles." Journal of the Mechanics and Physics of Solids, 11 (5): 357-372.

Zhang, S., Correlative focused ion beam scanning electron microscope and x-ray micro-computed tomography imaging on multiscale drug release characterization and three-dimensional-printing manufacturing. CRS 2017 Annual Conference Poster Presentation. Poster No. 128, Jul. 16-19, 2017, Boston.

Pisano, Roberto, Antonello A. Barresi, Luigi C. Capozzi, Giorgia Novajra, Irene Oddone, and Chiara Vitale-Brovarone. Characterization of the mass transfer of lyophilized products based on X-ray micro-computed tomography images. Drying Technology, vol. 35, No. 8., 933-938, 2017.

Qureshi SA, McGilveray IJ. Typical variability in drug dissolution testing: Study with USP and FDA calibrator tablets and a marketed drug (glibenclamide) product. Eur J Pharm Sci 1999;7:249-258.

Siepmann, et al., "Modeling of diffusion controlled drug delivery," J Control Release. Jul. 20, 2012;161(2):351-62. doi: 10.1016/j.jconrel.2011.10.006. Epub Oct. 13, 2011.

Wang et al., "Micro-CT analysis of matrix-type drug delivery devices and correlation with protein release behaviour," J Pharm Sci. Jun. 2010;99(6):2854-62. doi: 10.1002/jps.22027.

Byrnes et al., "Comparison of Core Petrophysical Properties Between Low-Permeability Sandstone Reservoirs: Eastern U.S. Medina Group and Western U.S. Mesaverde Group and Frontier Formation," SPE 60304 proceedings of the 2000 SPE Rocky Mountain Regional/Low Permeability Reservoirs Symposium held in Denver, CO, Mar. 12-15, 2000, p. 10.

Byrnes et al., "Issued With Gas and Water Relative Permeability in Low-Permeability Sandstones," AAPG Hedberg Conference, Understanding, Exploring and Developing Tight Gas Sands, Apr. 24-29, 2005.

Castle et al., "Petrophysics of Lower Silurian sandstones and integration with the tectonic-stratigraphic framework, Appalachian basin, United States," AAPG Bulletin, vol. 89, No. 1, Jan. 2005, pp. 41-60.

Jones et al, 1980, A laboratory study of low-permeability gas sands: paper SPE 7551-PA, Journal of Petroleum Technology, v. 32, No. 9, p. 1631-1640. DOI: 10.2118/7551-PA.

Rose, W., "Some Problems in Applying the Hassler Relative Permeability Method," 32 J. Petroleum Technology, 1161-63 (Jul. 1980).

Kancksted, M. a., Sheppard, a. P., Sahimi, M., 2001. Pore network modelling of two-phase flow in porous rock: The effect of correlated heterogeneity. Adv. Water Resour. 24, 257-277. doi:10.1016/80309-1708(00)00057-9.

Lahiri, Arka, Chandrashekhar Tiwary, Kamanio Chattopadhyay, Abhik Choudhury, Eutectic colony formation in systems with interfacial energy anisotropy: A phase field study, Computational Materials Science, vol. 130, Apr. 1, 2017, pp. 109-120.

Olsen et al., Two-fluid Flow in Sedimentary Rock: Simulation, Transport and Complexity, J. Fluid Mechanics, vol. 341, 1997, pp. 343-370.

Whitaker, "The Method of Volume Averaging," Kulver Academic Publishers, EBook, 1999, 236 pages.

Rivas-Gomez, S. et al., "Numerical Simulation of Oil Displacement by Water in a Vuggy Fractured Porous Medium," Society of Petroleum Engineers, Feb. 11, 2001-Feb. 14, 2001, SPe 66386, pp. 1-9.

Byrnes, A.P., Cluff, R.C., and Webb, J.C., 2009, Analysis of Critical Permeability, Capillary and Electrical Properties for Mesaverde Tight Gas Sandstones from Western U.S. Basins, U.S. Department of Energy Final Technical Report for Project #DE-FC26-05NT42660, DOI 10.2172/971248, 248 pgs.—https://www.osti.gov/servlets/purl/971248.

Byrnes, "Permeability, Capillary Pressure, and Relative Permeability Properties in Low-Permeability Reservoirs and the Influence of Thin, High-Permeability Beds on Production," Gas in Low Permeability Reservoirs of the Rocky Mountain Region, The Rocky Mountain Association of Geologists, 2005, p. 69-108.

Canter, et al, "Primary and Secondary Organic Matter Habit in Unconventional Reservoirs," in T. Olson, ed., Imaging Unconventional Reservoir Pore Systems: AAPG Memoir 112, 2016, p. 9-24.

Heiba, A.A., Davis, H.T., and Scriven, L.E., 1984, Statistical network theory of three-phase relative permeabilities, SPE/DOE #12690, SPE/DOE Fourth Symposium on Enhanced Oil Recovery, Tulsa, OK, Apr. 15-18, 1984, p. 121-134.

International Preliminary Report on Patentability for Application No. PCT/US2018/054546, entitled "System and Method for Computing Drug Controlled Release Performance Using Images" date of issuance: Apr. 8, 2020.

International Search Report and Written Opinion for Application No. PCT/US2018/054546, entitled "System and Method for Computing Drug Controlled Release Performance Using Images" date of mailing: Mar. 22, 2019.

Davis Yohanes Arifin et al., "Mathematical modeling and simulation of drug release from microspheres: Implications to drug delivery systems", Advanced Drug Delivery Reviews, vol. 58, No. 12-13, Nov. 1, 2006, pp. 1274-1325.

* cited by examiner

701 | 3D DIGITIAL REPRESENTATION

702 | ABS. PERM. SIMUL.

703 | CAP. P. SIMUL.

704 | SW1 | SNW1 | SWn | SNWn

705 | ABS. PERM. SIMUL. | ABS. PERM. SIMUL. | ABS. PERM. SIMUL. | ABS. PERM. SIMUL.

706 | 2P SW AND SNW REL. PERMEABILITY

FIG. 7

```
1201 ┌─────────────────────────────────────┐
     │      3D FACIES RECONSTRUCTION       │
     └─────────────────────────────────────┘

1202 ┌───────────┐
     │ EFFECTIVE │  1203 ┌─────────────────────────────┐
     │PERMEABILITY│       │       EFFECTIVE CAP. P.      │
     └───────────┘       └─────────────────────────────┘
                  1204 ┌──────────┐        ┌──────────┐
                       │  E. SW1  │        │  E. SWn  │
                       └──────────┘        └──────────┘
                       ┌──────┐  ┌──────┐
                       │ F_1  │  │ F_N  │
                  1205 │ SW1  │  │ SW1  │
                       └──────┘  └──────┘
                       ┌──────┐  ┌──────┐
                       │ F_1  │  │ F_1  │
                  1206 │ SW1  │  │ SW1  │
                       │ Kabs │  │ Kabs │
                       └──────┘  └──────┘

1207 ┌─────────────────────┐
                       │   DARCY FLOW MODEL  │
                       └─────────────────────┘

1208 ┌─────────────────────┐
                       │  SW1 E. ABS. PERM.  │
                       └─────────────────────┘

1209 ┌─────────────────────────────────────┐
     │      EFFECTIVE REL. PERMEABILITY    │
     └─────────────────────────────────────┘
```

FIG. 12

SYSTEM AND METHODS FOR COMPUTING PHYSICAL PROPERTIES OF MATERIALS USING IMAGING DATA

RELATED APPLICATIONS

This application is related to and claims priority to U.S. Provisional Patent Application No. 62/588,642 filed on Nov. 20, 2017, the content of which is incorporated herein by reference in its entirety.

FIELD OF THE INVENTION

The disclosed subject matter herein relates generally to computing physical properties and, more particularly, to systems and methods for computing physical Properties of materials using imaging data.

BACKGROUND

The disclosed subject matter herein can relate to a method to compute advanced physical properties such as two-phase and three-phase relative permeabilities of porous material samples.

Permeability is a transport physics property of a porous material. It characterizes how easy a fluid goes through a porous material. When there is only one fluid saturating the pore space, the capability of the same fluid going through the porous sample is denoted as the absolute permeability, $k_{abs}$, of the fluid to the material sample. For easier discussion, this fluid is referred to as fluid W. Permeability is then defined by Darcy's law, which linearly dependent on the velocity, v, of fluid A, the dynamic viscosity, $\mu$, of fluid A, the thickness of the material sample, $\Delta x$, and the inverse of the pressure difference, $\Delta P$, between the inlet and outlet of the sample. This relationship is described by equation 1, $$k_{abs} = \frac{v\mu\Delta x}{\Delta p} \quad (Eq. 1)$$

When additional fluids are present, either as part of pore saturation fluid or as the displacing fluid entering from the exterior surface of the material, permeability is measured with regard to a specific fluid, hence is referred to as relative permeability. For easier discussion, it is assumed that a second fluid, denoted as NW, is displacing fluid W, and saturates a porous material sample by pressure. At any instance in time, the porous material sample is saturated with some fraction of both fluid W and fluid NW with a distinctive fluid interface between fluid W and fluid NW. The abbreviation of W denotes wetting fluid which is the fluid that has a larger contact angle with the solid surface comparing with the other fluid, i.e., the non-wetting fluid. The pore space partially saturated with fluid NW reduces the pore space available to fluid W. Consequently, the relative permeability to fluid W is smaller than the corresponding absolute permeability of fluid flow through the total pore space. For easier comparison, relative permeability is normalized by absolute permeability, hence is always a value between 0 and 1. In the previously mentioned two-phase system, fluid W can be water, and fluid NW can be oil. Relative permeabilities are denoted as $k_{ro}$, and $k_{rw}$ for oil and water respectively. When three or more fluid phases are present, relative permeabilities are denoted according to the specific fluid. For example, in a common hydrocarbon reservoir where oil, gas and water co-exist, relative permeabilities are denoted as $k_{ro}$, $k_{rg}$ and $k_{rw}$. Two-phase and three-phase relative permeabilities are the most common relative permeabilities in industrial applications.

Relative permeabilities are measured against specific saturations. The saturation of fluid W, denoted as Sw, is the volume fraction of the pore volume in a porous medium that is occupied by fluid W with reference to the total pore space. Saturation is always a value between 0 and 1. A saturation level of 1 indicates that the entire available pore space in a given porous medium is filled by the fluid under consideration. Saturation is the primary influence factor to relative permeabilities. As the saturation of a particular fluid increases, its relative permeability increases. Saturation history also has a major effect on relative permeability. The relative permeability-saturation relationship exhibits a hysteresis effect between the drainage process (wetting phase decreasing) and the imbibition process (wetting phase increasing).

In geo-scientific applications, because subsurface flows are intrinsically multiphase, relative permeabilities are very important to characterizing the flow behavior. While they are helpful in understanding hydrocarbon generation and migration in source rocks, they are also critical in assessing recovery factors and designing production plans. In addition to geoscience applications, such as oil reservoir simulation, oil or gas production rate estimation, and recovery factor determination, the method described in the disclosed subject matter herein can also be useful in advancing understanding and designing new products in the life sciences, paper manufacturing, the food industry, agriculture, and other industrial areas relating transport phenomenon through an interconnected micro-structure network in a material.

The disclosed subject matter herein can solve advanced computing physical properties, such as relative permeabilities to improve evaluations and estimations of the potential productivity of an oil field or other subterranean reservoirs, and to enhance characterization of the multiphase flow behavior through a porous material in general.

The disclosed subject matter herein can also relate to a computerized system, and components thereof, for performing such a method through a desktop computer or a computing cloud.

SUMMARY

A method for computing physical properties of materials, such as two-phase and three-phase relative permeabilities through a porous material, is disclosed. The method employs single or multi-scale digital images of a representative sample which capture one or multiple fractionations of a micro-structure size cascade at the respective, required imaging resolutions. At a high resolution, the method computes basic physical properties, such as absolute permeabilities with a numerical method such as computational fluid dynamics solving the Navier-Stokes equation, and capillary pressure with simulations solving Young-Laplace equation. Saturation states of multiple fluids are combined to derive capillary pressure relationships at low resolutions when necessary. Upscaled physical properties, such as upscaled relative permeabilities corresponding to the low resolutions, are subsequently computed using the composition of multiple permeable facies at corresponding upscaled saturations determined by upscaled capillary pressure, honoring upscaled governing laws of the physical property, such as Darcy's law. Computing systems and programs for performing these methods are also disclosed.

In one aspect, the disclosed subject matter discloses a method for computing advanced physical properties of porous materials, which comprises: (a) selecting a sample representative of a porous material; (b) determining whether single or multiple resolutions are needed to image the sample, the number of resolutions, the number and types of imaging devices needed, and whether an additional inter-resolution modeling is needed; (c) acquiring three-dimensional images of the sample at a first resolution; (d) constructing a first three-dimension digital representation of the sample at the first resolution using the three-dimension images of the first resolution, with an additional inter-resolution model when needed; (e) acquiring three-dimension images of a region of the sample at one or more additional resolutions, wherein the one or more additional resolutions are higher than the first resolution; (f) constructing one or more additional three-dimension digital representations of the region of the sample at the one or more additional resolutions using the three-dimension images of the one or more additional resolutions; (g) computing basic physical properties and advanced physical properties of the region using the one or more additional three-dimension digital representations; (h) upscaling to compute physical properties of the sample using the first three-dimension digital representation constructed at Step (d) and the basic and advanced physical properties computed at Step (g) using the one or more additional three-dimensional digital representation; and (i) iterating Steps (d) through (h) when necessary.

In some embodiments, the porous material is selected from the list of following: rock, soil, zeolite, biological tissue, electrode, foam, polymer material, wood, cement, ceramic, sand, clay, inorganic compound, organic compound, metal, and other material with micro-structures.

In some embodiments, the images of the first and the one or more additional resolutions are acquired using any one or a combination of the following: imaging log, digital photography, light microscopy, magnetic resonance imaging, ultrasound imaging, x-ray computed tomography, electron microscopy, neutron tomography, Raman imaging, mass spectroscopy imaging, ion microscopy, and other imaging methods.

In some embodiments, the porous material includes one or more of interconnected pores, interconnected particles, interconnected material phases, interconnected chemical compounds, interconnected elements, and other interconnected micro-structures.

In some embodiments, (a) the basic physical properties include absolute permeability and capillary pressure, (b) the advanced physical properties include two-phase and three-phase relative permeabilities, and (c) the upscaled physical properties include upscaled effective absolute permeability, upscaled effective capillary pressure, and upscaled effective two-phase and three-phase relative permeabilities.

In some embodiments, the method for computing advanced physical properties of porous materials further comprises (a) acquiring two-dimension images of the sample at the first resolution; (b) constructing the first three-dimension digital representation of the sample at the first resolution using the two-dimension images of the first resolution; (c) acquiring two-dimension images of a region of the sample at the one or more additional resolutions, wherein the one or more additional resolutions are higher than the first resolution; (d) constructing the one or more additional three-dimension digital representations of the region of the sample at the one or more additional resolutions using the two-dimension images of the one or more additional resolutions; (e) computing the basic physical properties and the advanced physical properties of the region using the one or more three-dimension digital representation; (f) upscaling to compute physical properties of the sample using the first three-dimension digital representation constructed at Step (c) and the basic and advanced physical properties computed at Step (e) using the one or more additional three-dimensional digital representations; and (g) iterating Steps (b) through (f) when necessary.

In some embodiments, the first and the one or more three-dimension digital representations are reconstructed from the two-dimension images of the first and the one or more additional resolutions using texture synthesis, multi-point statistics, or pore network modeling.

In another aspect, the disclosed subject matter discloses a method for computing advanced physical properties of porous materials based on a type of representative elementary volume (REV) specifically with regard to an imaging approach, which comprises: (a) selecting a sample representative of a porous material; (b) determining a field of view and a first resolution to be used to acquire images of the sample; (c) acquiring two-dimensional or three-dimensional images of the sample at the first resolution; (d) assessing whether all features are captured and determining whether additional imaging is needed; (e) if additional imaging is needed, acquiring additional two-dimensional or three-dimensional images of the sample at one or more additional resolutions until no additional imaging is needed; and (f) if additional imaging is not needed, determining a type of the sample using the captured imaging data based on (1) whether locations of property regions are known, and (2) whether properties of each of the property regions can be characterized at the first resolution, wherein the sample is a Type 1—homogeneous system, where the field of view contains multiple property regions where the locations of all property regions within the field of view are known, and where the properties for the multiple property regions can be representatively characterized at the first resolution, wherein the sample is a Type 2—fractal heterogeneous porous system, where the field of view contains multiple property regions where the locations of all property regions within the field of view are known, and where the properties for at least some of the multiple property regions cannot be characterized at the first resolution but can be characterized at the one or more additional resolutions, and wherein the sample is a Type 3—heterogeneous porous system with inter-resolution features, where the field of view contains multiple property regions where the locations of at least some of the multiple property regions within the field of view are not known but can be characterized with an inter-resolution model, and where the properties for at least some of the multiple property regions cannot be characterized at the first resolution but can be characterized at the one or more additional resolutions and the inter-resolution model.

In some embodiments, the method for computing advanced physical properties of porous materials based on a type of representative elementary volume (REV) specifically with regard to an imaging approach further comprises: if the sample is a Type 1, capturing the field of view only with the first resolution.

In some embodiments, the method for computing advanced physical properties of porous materials based on a type of representative elementary volume (REV) specifically with regard to an imaging approach further comprises: if the sample is a Type 2, determining resolution and field-of-view for each of the multiple property regions, characterizing each of the multiple property regions independently with the one or more additional resolutions, and assigning a pseudo-property computed at the one or more additional resolutions to each of the multiple property regions at the first resolution.

In some embodiments, the method for computing advanced physical properties of porous materials based on a type of representative elementary volume (REV) specifically with regard to an imaging approach further comprises: if the sample is a Type 3, determining resolution and field-of-view for each of the multiple property regions, determining an appropriate inter-resolution model, and characterizing each of the multiple property regions independently with the one or more additional resolutions and the inter-resolution model, assigning a pseudo-property to each of the multiple property regions, including the regions defined by the inter-resolution model, at the first resolution.

In some embodiments, the method for computing advanced physical properties of porous materials based on a type of representative elementary volume (REV) specifically with regard to an imaging approach further comprises: determining a representative elementary volume (REV) of the sample with regard to an imaging method, the type of the sample, and the physical properties to be characterized.

In yet another aspect, the disclosed subject matter discloses a method for upscaling advanced physical properties, such as relative permeabilities, which comprises: (a) reconstructing 3D facies of a Type 3 sample (heterogeneous porous system with inter-resolution features) at a first lower resolution, with an appropriate inter-resolution model; (b) determining facies permeabilities, capillary pressure and saturation states from one or more higher resolution 3D digital representations using a Navier-Stokes flow model; (c) determining permeability contribution of the inter-resolution model; (d) determining the influence of capillary pressure, and saturation states of the inter-resolution model; (e) computing permeability, capillary pressure, and saturation states in the first lower resolution 3D facies reconstruction on all the facies with physical properties from the one or more higher resolutions and the inter-resolution model; (f) iteratively validating computed permeability, capillary pressure, and saturation states when necessary; and (g) determining upscaled relative permeabilities from the first lower resolution 3D digital representation at each intermediate saturation state determined as in step (e) and permeabilities to the corresponding facies as in step (b) and (c).

In some embodiments, the method for upscaling advanced physical properties, such as relative permeabilities, further comprises computing advanced physical properties, such as two-phase and three-phase relative permeabilities using basic properties, permeability and capillary pressure using steady state saturation approach; computing absolute permeabilities on each discretized saturation state from capillary pressure data; and deriving relative permeabilities by referencing saturation-specific absolute permeability to the single fluid absolute permeability of the complete pore space.

In some embodiments, the method for upscaling advanced physical properties, such as relative permeabilities, further comprises determining upscaled saturation states of wetting and non-wetting fluid from one or multiple drainage and imbibition cycles with single wet and mixed wet conditions, using capillary pressure at the one or more higher resolutions, material phase segmentation at the first lower resolution, and an inter-resolution model.

In some embodiments, the method for upscaling advanced physical properties, such as relative permeabilities, further comprises upscaling advanced physical properties, such as upscaled two-phase and three-phase relative permeabilities at the corresponding lower resolution using two-phase and three-phase relative permeabilities at the one or more higher resolutions, upscaled saturation states, material phase segmentation at the corresponding lower resolution, and an inter-resolution model.

In some embodiments, the method for upscaling advanced physical properties, such as relative permeabilities, further comprises determining a necessity of an inter-resolution model, and determining the appropriate inter-resolution model.

In some embodiments, the method for upscaling advanced physical properties, such as relative permeabilities, further comprises constructing an inter-resolution model comprising (a) Construction of an inter-resolution model as exemplified by a slot pore system in a rock sample; and (b) Classification of the inter-resolution models, using a distance-based method, a geometry-based, a random method, or other methods.

In yet another aspect, the disclosed subject matter discloses a system for computing two-phase and three-phase relative permeability from a porous material sample, which comprises: (a) one or more imaging devices capable of producing two- or three-dimensional digital images of a porous material at one or more resolutions; (b) a first computer comprising at least one processor operable for executing a computer program capable of classifying elements in the two- or three-dimensional digital images as solid (grain) and pore (void); (c) a second computer comprising at least one processor operable executing a computer program capable of reconstructing three dimensional digital representations from two dimensional images or three dimensional images; (d) a third computer comprising at least one processor operable executing a computer program capable of performing computations of absolute permeability, capillary pressure, and two and three phase relative permeability at least one or multiple resolutions; (e) at least one storage device to store results of computations; (f) a program administrating computation resources, data, communication and all other relevant information including, but not limited to, date, time, analyst, log, and computing note; and (g) a user interface, either desktop-based or cloud-based, that allows a user to operate all of the above graphically to textually, wherein the second or the third computer can be same as or different from the first computer.

Additional features of the disclosed subject matter include:

A method, wherein the three-dimensional digital representation of the images at a particular resolution are either collected in three-dimensions, or reconstructed from two-dimensional digital images using texture synthesis, phase field function, multipoint statistics, or pore network modeling.

A method to compute basic properties, such as absolute permeability at high resolution using direct numerical simulation of governing partial differential equations, such as Navier-Stokes equations, and capillary pressure at high resolution using an algorithm honoring Young-Laplace equation to establish discretized saturation states.

A method for computing advanced physical properties, such as two-phase and three-phase relative permeabilities using basic properties, such as permeability and capillary pressure and a discretization approach, such as steady state saturation. Absolute permeabilities on discretized saturations state from capillary pressure simulation are computed, and relative permeabilities are derived by referencing saturation-specific absolute permeability to the single fluid absolute permeability of the complete pore space.

A method of determining whether single or multiple resolutions are necessary, and the imaging modality, resolution, and sample volume at single or multiple resolutions.

A method to correlate one low resolution image to one or multiple high resolution images in order to determine appropriate fractional scale correlation.

A method to determine the necessity of an inter-resolution model, and the appropriate inter-resolution model.

A method for upscaling basic physical properties such as permeability and capillary pressure from high resolution image data to low resolution image data based on the porosity, permeability, capillary pressure at high resolution, material phase segmentation at one ore multiple low resolutions, and an inter-resolution model.

A method to determine saturation states of wetting and non-wetting fluid from one or multiple drainage and imbibition cycles with single wet and mixed wet conditions, using capillary pressure at high resolution, material phase segmentation at one or multiple low resolutions, and an inter-resolution model.

A method for upscaling advanced physical properties, such as upscaled two-phase and three-phase relative permeabilities at the corresponding resolution using two-phase and three-phase relative permeabilities at higher resolutions, saturation states, material phase segmentation at the corresponding resolution, and an inter-resolution model.

A system computing two-phase and three-phase relative permeability from a porous material sample that comprises: a) one or multiple imaging devices capable of producing two or three dimensional digital images of a porous material at one or multiple resolutions, b) a computer that comprises at least one processor operable for executing a computer program capable of classifying elements in the two or three dimensional digital images as solid (grain) and pore (void), c) a computer (the same as, or different than, b)) comprising at least one processor operable executing a computer program capable of reconstructing three dimensional digital representations from two dimensional images or three dimensional images; d) a computer (the same as, or different than, b)) comprising at least one processor operable executing a computer program capable of performing computations of absolute permeability, capillary pressure, and two and three phase relative permeability at least one or multiple resolutions; e) at least one storage device to store results of the computations; f) a program administrating computation resources, data, communication and all other relevant information including, but not limited to, date, time, analyst, log, and computing note; g) a user interface, either desktop-based or cloud-based, that allows the user to operate all of the above graphically to textually.

The disclosed subject matter herein can also relate to the use of the indicated method and/or system to compute relative permeabilities to provide improved evaluations and estimates of the productivity of the subterranean reservoir. The methods and systems of the disclosed subject matter herein can also be used to characterize a multiphase transport phenomenon through other types of porous media and interconnected micro-structure network.

The disclosed subject matter herein can also relate to the use of the indicated method and/or system to compute relative permeabilities to provide improved evaluations and estimates of the productivity of the subterranean reservoir. The methods and systems of the disclosed subject matter herein can also be used to characterize a multiphase transport phenomenon through other types of porous media and interconnected micro-structure network.

It is to be understood that both the foregoing general description, and the following detailed description, are exemplary and explanatory only and are intended to provide a further explanation of the disclosed subject matter herein, as claimed.

BRIEF DESCRIPTION OF DRAWINGS

FIG. 7 is a schematic of a simulation module for two-phase relative permeability according to certain embodiments of the disclosed subject matter herein.

FIG. 12 is a schematic of an upscaling simulation module for relative permeability according to certain embodiments of the disclosed subject matter herein.

DETAILED DESCRIPTION

Unlike the simple linear relationships for absolute permeability defined by Eq. 1, relative permeabilities are complex to compute. They are nonlinearly dependent on, e.g., $k_{abs}$, the wettability between the fluids and the solid material system, the interfacial surface tension, the viscosity contrast between the fluid phases, the velocities of the fluids, the saturation level of different fluids in the pores, and the structure and connectivity of the pores in the porous solid and the pore space geometry. They are also dependent on the saturation history, e.g., the migration and production history, of a hydrocarbon reservoir. The compositional and phase change of the multiple fluids often happen during multiphase flow and further complicate relative permeabilities. Hence, measuring relative permeability is challenging.

In practice, relative permeabilities can be estimated by physical lab tests or by numerical simulations. One of the early physical lab methods for measuring relative permeability is described in U.S. Pat. No. 2,345,935 (Hassler). The method involves sealing all but two opposing exterior surfaces on a porous rock sample. The fluid, or fluids, under pressure are introduced into one open surface and forced to flow through the sample at a specified flow rate. Fluid pressures are generated by pumps or similar pressure devices. One shortcoming of the Hassler technique is the need to determine internal wetting fluid pressures within the porous medium. This problem is described by W. Rose in the publication "Some Problems in Applying the Hassler Relative Permeability Method," 32 J. Petroleum Technology, 1161-63 (July, 1980) and U.S. Pat. No. 4,506,542 (Rose). They proposed an apparatus and method that does not require measurement of internal pressures for the estimation of relative permeability.

Figure 1:
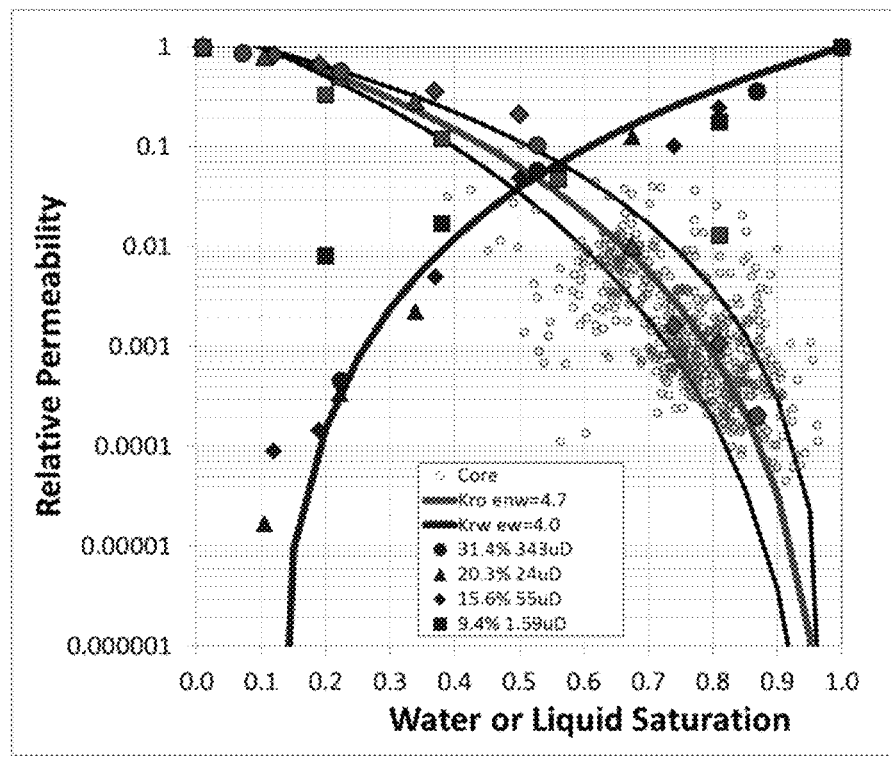
FIG. 1 shows a representative plot of a two-phase relative permeability.

The Hassler method is a Steady State Method that can be used to measure relative permeability versus saturation for a full range of saturations from 0 to 1. For two-phase systems, the porous material sample is typically cleaned first, and then fully saturated with one fluid. Then the other fluid, or a combinations of the two fluids, are forced through the sample for a sufficient time to achieve steady out-fluxes of two fluids, i.e., a steady state. At this point, the flux and pressure readings are recorded and converted to $k_m$ and $k_w$ at the particular saturation. The ratio of the two fluids at the inlet of the sample can then be changed, and forced through the sample for a sufficient time to achieve a steady state of the two fluxes. Another pair of relative permeabilities, $k_m$ and $k_{rw}$, corresponding to another saturation state, is calculated. By repeating this procedure for different combinations of wetting and non-wetting fluids, a graph of relative permeability versus saturation can be plotted as shown in FIG. 1.

Other steady state physical methods to compute relative permeability include the Penn State Method (Snell, R. W., Measurements of gas-phase saturation in a porous medium, J. Inst. Pet., 45 (428), 80, 1959); The Hafford method (Naar, J. et al., Three-phase imbibition relative permeability, Soc. Pet. Eng. J., 12, 254, 1961); the Single-Sample Dynamic Method; the Stationary Fluid Method and the Dispersed Feed Method. The latter three are all described in (Saraf, D. N. et al., Three-phase relative permeability measurement using a nuclear magnetic resonance technique for estimating fluid saturations, Soc. Pet. Eng. J., 9, 235, 1967).

Another method, the Un-Steady State Method, also begins with the rock sample being initially saturated with the wetting fluid. Then, the non-wetting fluid is forced through the sample, the fraction of non-wetting fluid is recovered and the pressure drop across the sample is recorded and used to calculate various combinations of kn and kw at corresponding values of Sw. Measurement data is collected in a way that no steady state is achieved or maintained during the experiment.

Figure 2:
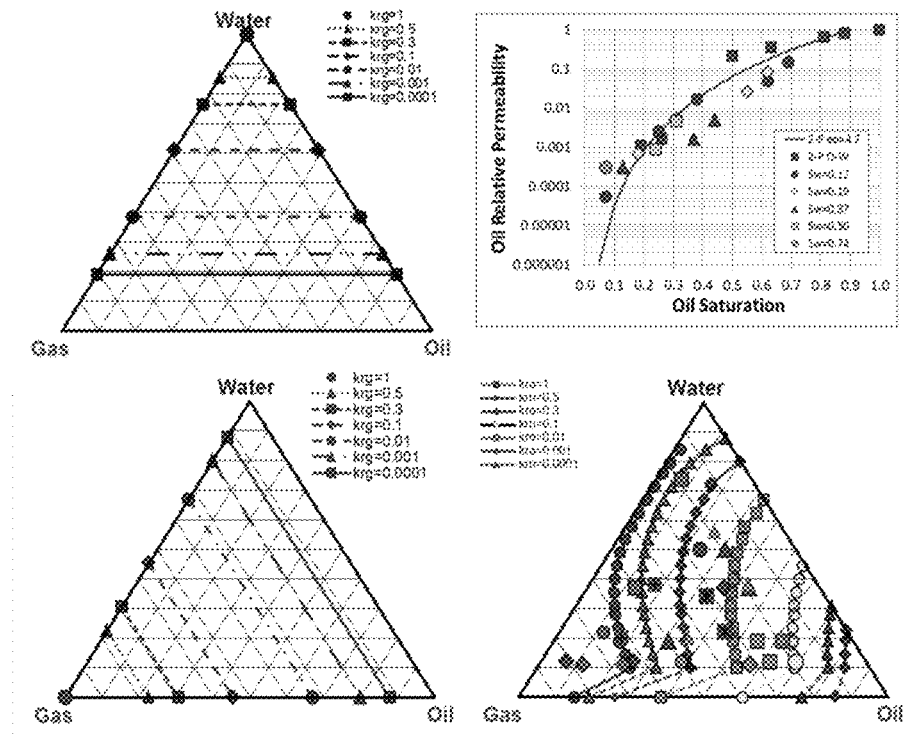
FIG. 2 is a representative plot of a three-phase relative permeability.

A laboratory measurement on three-phase relative permeability is lengthy and expensive, hence, rarely done. FIG. 2 shows an example. Laboratory methods can suffer from a number of shortcomings, which may include one or more of the following: 1) The sample to be tested is in the lab at surface conditions whereas the in-situ sample is at reservoir conditions with a much higher temperature and pressure. When samples are brought to the surface, many properties of the rock change. Creating artificial conditions to replicate downhole conditions is difficult, expensive, and imprecise. 2) The pressures required to achieve desired flow rates may be extremely high, particularly for porous material samples with very small pores, causing leakage problems, sample damage, and/or equipment malfunctions. 3) Tests can take a very long time, up to months, or more than a year, to complete, while very tight formations, such as shales, may be impossible to measure. 4) Initial conditions, such as saturation, wettability, and fluid distributions, are difficult to establish.

An image-based rock physics method uses numerical simulations to calculate relative permeability on a rock sample digitized with three dimensional imaging. A porous rock sample is first digitized with an X-Ray Micro-Computed Tomography scanner (MicroCT, sometimes referred to as X-Ray Microscopy or XRM), Focused Ion Beam Scanning Electron Microscopy (FIB-SEM), or any other 3D imaging apparatus. The 3D pore network is reconstructed from the processed 3D image volume. Various numerical simulation techniques, including pore network models, the Lattice Boltzmann Method, and the conventional computational fluid dynamic method, are used to solve various formats of governing flow equations. For example, [Olsen et al., Two-fluid Flow in Sedimentary Rock: Simulation, Transport and Complexity, J. Fluid Mechanics, Vol. 341, 1997, pp. 343-370]; [Gustensen et al., Lattice-Boltzmann Studies of Immiscible Two-Phase Flow Through Porous Media," J. of Geophysical Research, V. 98, No. B 4, Apr. 10, 1993, pp. 6431-6441)]; [Blunt, M. J., Bijeljic, B., Dong, H., Gharbi, O., Iglauer, S., Mostaghimi, P., Paluszny, A., Pentland, C., 2013. Pore-scale imaging and modelling. Adv. Water Resour. 51, 197-216. doi:10.1016/j.advwatres.2012.03.003]; [Kanckstedt, M. a., Sheppard, a. P., Sahimi, M., 2001. Pore network modelling of two-phase flow in porous rock: The effect of correlated heterogeneity. Adv. Water Resour. 24, 257-277. doi:10.1016/S0309-1708(00)00057-9]; [Raeini, A. Q., Bijeljic, B., Blunt, M. J., 2014. Numerical Modelling of Sub-pore Scale Events in Two-Phase Flow Through Porous Media. Transp. Porous Media 101, 191-213. doi:10.1007/s11242-013-0239-6]; [B Ahrenholz et al., "Prediction of capillary hysteresis in a porous material using lattice-Boltzmann methods and comparison to experimental data and a morphological pore network model," Advances in Water Resources, vol. 31, Issue 9, September 2008, pp. 1151-1173]; [Rivas-Gomez, S. et al., "Numerical Simulation of Oil Displacement by Water in a Vuggy Fractured Porous Medium," Society of Petroleum Engineers, Feb. 11, 2001-Feb. 14, 2001, SPE 66386, pp. 1-9.]. In U.S. Pat. No. 9,183,326 (de Prisco) and U.S. Pat. No. 9,140,117 (de Prisco), a numerical method based on the Lattice Boltzemann Method for evaluating two-phase relative permeability for fractional multi-phase, multi-component fluid flow through porous rock is proposed.

Numerical methods can have advantages over laboratory methods. Because numerical simulations are virtual, physical conditions as downhole fluid flow under reservoir temperature and pressure can be studied without constrictions of apparatus of physical experiments. Consequently, image-based numerical relative permeability calculation can reach the parameter space that is difficult, or impossible, to achieve in physical measurement. Furthermore, because simulations can numerically accelerate the time scale used, particularly when combined with high performance computing, image-based physics relative permeability can be completed in a matter of hours or days instead of weeks, months, or longer.

An image-based rock physics method is subjected to limitations and drawbacks. First and foremost, the accuracy of numerical methods to calculate relative permeability, such as the Nur method, depends on the accuracy of the 3D imaging resolution. The 3D imaging data is made up of discrete cubic cells called voxels. Uncertainties exist regarding whether a voxel belongs to pore space or solid matrix. For example, there could be pores smaller than the size of one imaging voxel, hence such a voxel would contain both pore and solid. Imaging artifacts can obscure the boundary of a pore. Rock samples can contain residue fluid that escalates the imaging artifacts. Increasing resolution can reduce some of these uncertainties. However, as the image signal detector has limited number of detection units (pixels), a higher resolution always requires a reduction of the imaging field of view, and consequently reduces the size of the sample being imaged. Hence, sample representativeness is often at risk. In addition, the accuracy of numerical methods to compute relative permeability also depends on the numerical methods applied. Pore network modeling heavily depends on how the pore space is simplified. Consequently, it often depends on experimental data which renders it away from a truly predictive tool [Bondino I., Hamon G., Kallel W., Kachuma D. "Relative permeabilities from simulation in 3D rock models and equivalent pore networks: critical review and way forward". SCA2012-01]. In U.S. Pat. No. 9,140,117 (de Prisco), the dependence of the Lattice Boltzmen multiphase flow solver on boundary conditions is extensively discussed, but reproducibility is not always achievable.

It is recognized that there is a need for new methods and systems for measuring two-phase and three-phase relative permeabilities efficiently, accurately and reproducibly on porous material samples that cannot be imaged at one single resolution which is primarily due to the heterogeneity of the material sample, and the limited field of view of the imaging devices. The study, [Zhang, S., Klimenitise R. and Barthelemy P. "Micron to millimeter upscale of shale rock properties based on 3D imaging and modeling". *Society of Core Analysis* 2012 Meeting, paper A080, Aberdeen, UK, Aug. 26-31, 2012], documented an upscaling framework for porosity and permeability combining MicroCT and FIB-SEM resolutions. The study, [Dehghan Khalili, A., Arns, J. Y., Hussain, F., Cinar, Y., Pinczewski, W. V., Arns, C. H., 2013. Permeability Upscaling for Carbonates from the Pore-Scale Using Multi-Scale X-Ray-CT Images. SPE Reserv. Eval. Eng. 16, 353-368. doi:10.2118/152640-MS], proposed a method using multi-scale X-Ray CT images to upscale permeability. Advanced multi-phase flow properties, such as capillary pressure and relative permeability, were not addressed.

Certain embodiments of the disclosed subject matter can herein relate to a method for computing advanced physical properties such as two-phase (2P) and three-phase (3P) relative permeabilities through a porous material digitized fully or partially via two-dimensional (2D) or three-dimensional (3D) digital images at various scales integrated with a numerical simulation method, such as computational fluid dynamics (CFD), for calculating absolute permeabilities at various saturations. Certain embodiments of the disclosed subject matter herein can provide improved characterization of advanced physical properties, such as fluid transport of the porous material. These determinations can be made without the need for expensive, time-consuming and error-prone laboratory experiments on physical samples of the porous material. The method can combine images at various scales and numerical simulation results derived from them, and link the physical properties at various scales to larger sample which is considered minimally representative of a physics phenomenon, while the imaging resolution is insufficient to fully resolve the micro-structures important for the larger sample. The upscaled properties can be directly validated with the measurement results that are performed at larger scale with lower cost. The upscaled properties can also be directly used in centimeters or decimeters that are comparable to the method of simulating the introduction of non-wetting and wetting fluids into the pores at the inlet face of the 3D digital representation of a porous medium, and a process control application to achieve a quasi-steady state flow at low inlet concentrations of non-wetting fluid. In addition, the method of certain embodiments of the disclosed subject matter herein reduces the time required to complete the fluid dynamic calculations. The resulting values of the flow of non-wetting fluid, wetting fluid, saturation and other parameters can be used to generate plots of relative permeability imbibition and drainage curves. The ability to make these types of determinations on the fluid transports characteristics of the porous media can improve the accuracy of cost and technical decision-making made with respect to production of the porous media. Computerized systems and computer programs for performing the method are also provided.

The term "multi-phase" can refer to multiple phases of an element of a compound, such as liquid and vapor, and/or to multiple compounds in a mixture, such as oil and water. The fluids are categorized as wetting fluids and non-wetting fluids. Wetting fluids are fluids that tend to cover, or adhere to, the interior surface of pores in the porous medium. Wettability is the tendency of one fluid to spread on, or adhere to, a solid surface in the presence of other immiscible fluids. Wettability is defined by the contact angle of the fluid with the solid phase. Two examples of certain embodiments of the disclosed subject matter herein describe, (1) a system comprising one wetting fluid and one non-wetting fluid, i.e., a two-phase (2P) system, such as oil and water; and (2) a system comprising three fluids, i.e., a three-phase (3P) system, such as gas, oil and water. These systems represent the majority of fluid flow problems in a geo-scientific concern. However, the methods described herein can apply to systems that comprise multiple wetting and/or non-wetting fluids. The methods described herein can also apply to micro-structure networks other than porous media, which comprise, for example, rocks; soils; zeolites; biological tissues such as bones, wood, cork and similar materials; cements; ceramics; compacted solid particles, such as sand, clay, rock, ceramics, inorganic compounds, organic compounds, metals and similar materials; synthetic materials, such as polymers; and other similar materials.

A. Full Workflow Overview

Figure 3:
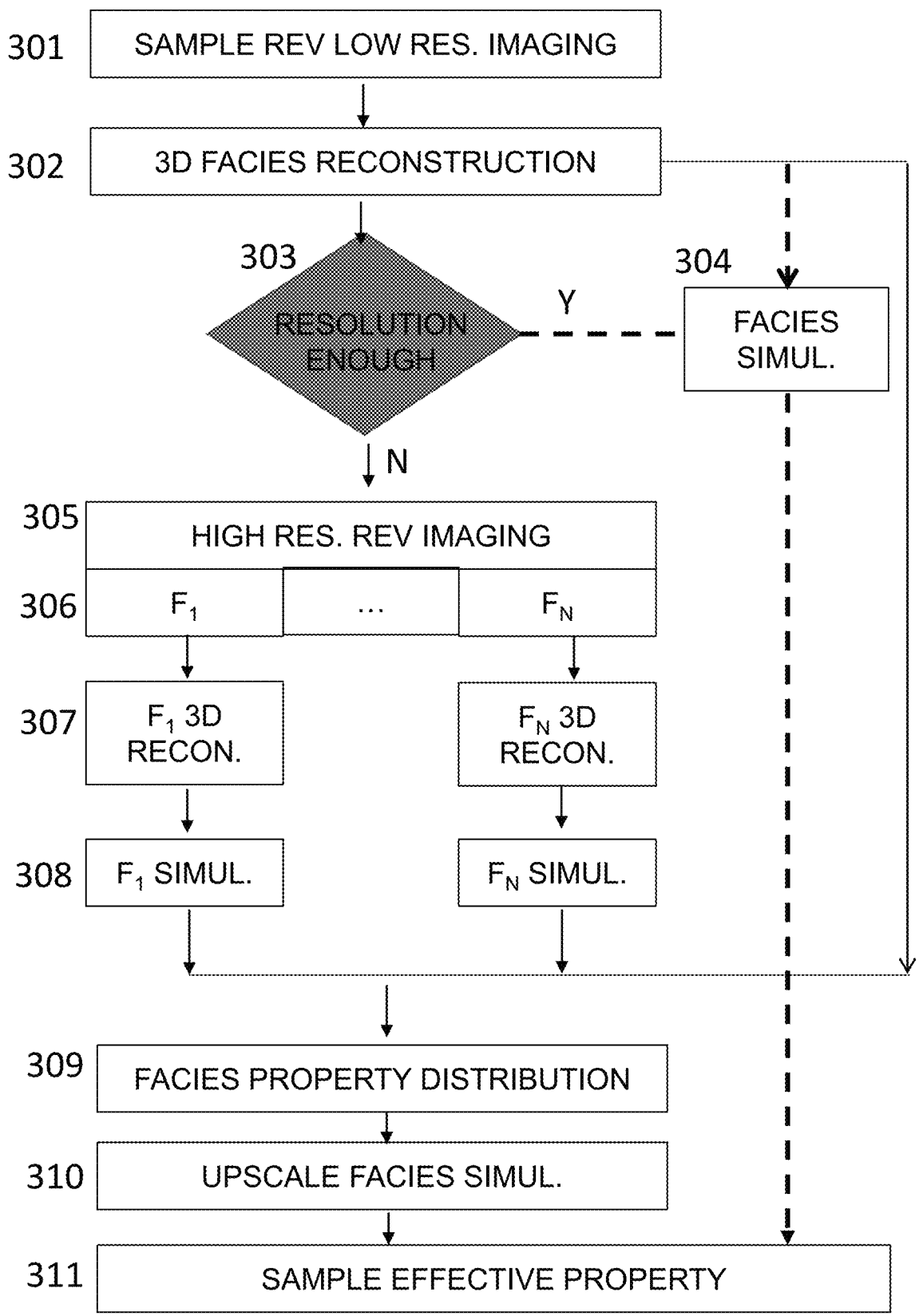
FIG. 3 is a schematic of the complete workflow according to certain embodiments of the disclosed subject matter herein.

The method of certain embodiments of the disclosed subject matter herein is shown schematically in FIG. 3. A physical sample from a porous medium can be imaged with an appropriate imaging device (301), most often X-Ray Micro-Computed Tomography (MicroCT) or Focused Ion Beam Scanning Electron Microscopy (FIB-SEM), either in two-dimensions (2D) or three-dimensions (3D). The sample can include sidewall cores, whole cores, drill cuttings, outcrop quarrying samples, or other sources. The imaging method can include digital photographs, light microscopy (LM) images, magnetic resonance imaging (MRI), ultrasound imaging (UAI), computed tomography (CT), micro-computed tomography (MicroCT), nano-computed tomography (NanoCT), transmission electron microscopy (TEM), Raman Imaging (RI), atomic force microscopy (AFM), scanning electron microscopy (SEM), or any imaging devices at the appropriate resolution. One part of the imaging step 301 is to determine a representative elementary volume (REV).

Figure 4:
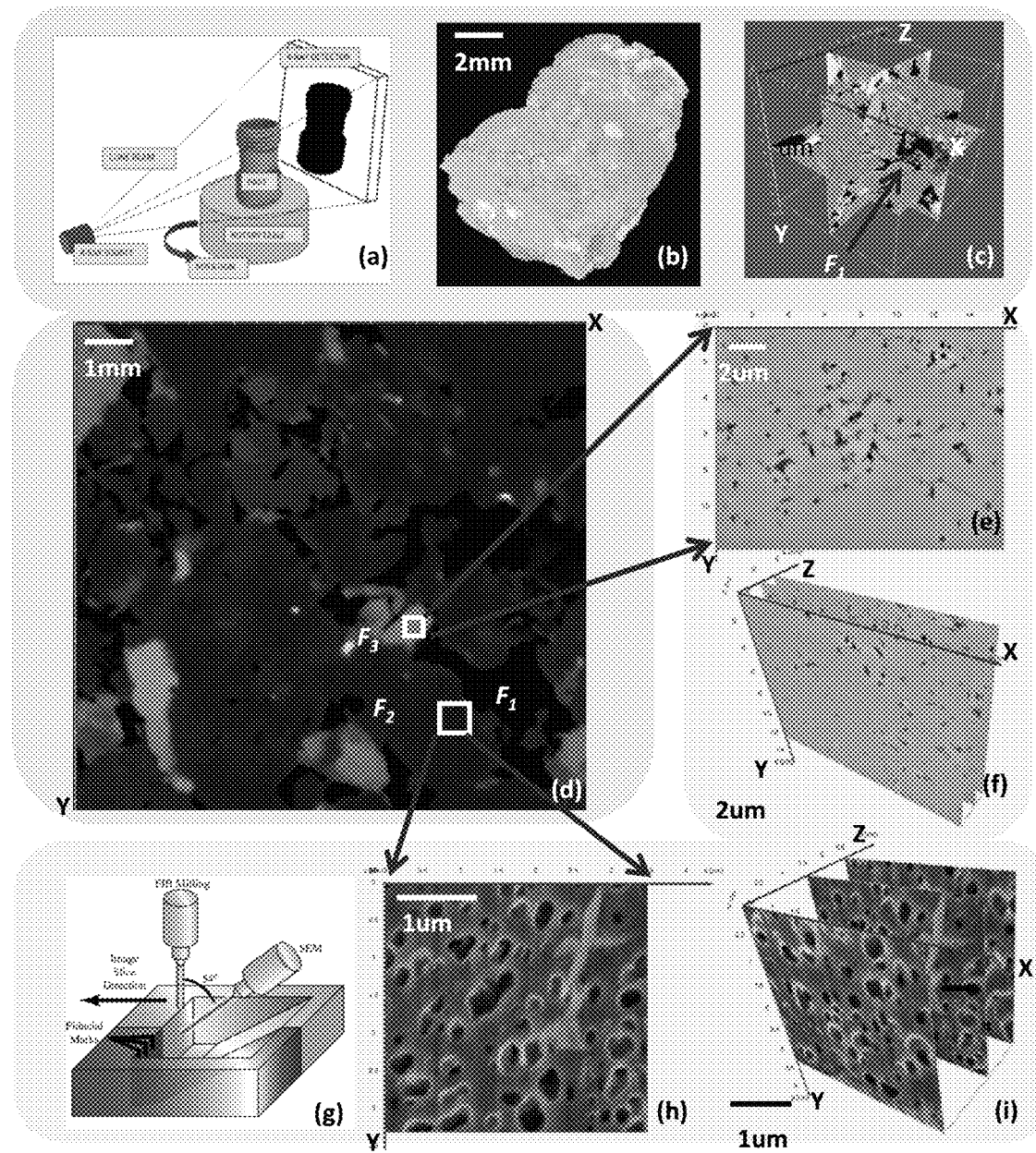
FIG. 4 illustrates an examples of multi-scale imaging procedures: (a) An experimental schematic of x-ray computed tomography which is the imaging methodology used to produce the results shown in Figures b, c & d. (b) The external surface of the irregular shale rock fragment. (c) The digitized fragment using mCT. (d) One XY slice of mCT data on the fragment. (e) One XY slice of FIB-SEM data on a F3 sample. (f) A digitized image stack of the F3 sample. (g). An experimental schematic of FIB-SEM. (h) One XY slice of FIB-SEM data on the F2 sample. (i) A digitized image stack of the F2 sample.

After the image data is acquired, the 3D digital representation of the rock facies will be reconstructed (302) with imaging processing, 2D to 3D modeling, or database mining methods. FIG. 4 illustrates such an example. X-ray MicroCT (FIG. 4a) was used to scan the rock fragment sample (FIG. 4b). A digitized 3D representation of the rock sample is reconstructed in 3D (FIG. 4c) and 2D (FIG. 4d).

An assessment on the resolution will then be conducted (303). If the resolution is sufficient to resolve the all pore throats, physical properties can be directly simulated from the 3D digital representation of the rock facies (304, and dashed line in FIG. 3). This is the effective property of the sample (311). This simplified, single resolution workflow is appropriate for porous material samples with relatively homogeneous pores. For example, clean chalk samples from Niobrara formation can be resolved with 10 nm resolution using FIB-SEM.

Otherwise, the current resolution is too coarse to resolve pore throats from one or multiple facies. Higher resolution (305) is necessary as described in the next paragraph. The current resolution, however, is still important to distinguish different rock facies because each has its own porosity system and petrophysical properties. Three facies are identified in FIG. 4d, denoted as $F_1$—intragranular porosity, F2—organic rich micro-porosity, and $F_3$—mineral rich micro-porosity. Note that, at the current resolution, it is possible for some pores and pore throats to be fully resolved, such as the intra-granular porosity as indicated by $F_1$ in FIG. 4d. If additional resolution is needed for other facies, a multi-scale approach is necessary. The higher resolution may depend on the facie which needs to be imaged and analyzed. The proper high resolution can be different for each different facie. Similar to Step 301 at lower resolution, high resolution imaging also needs to determine the REV at respective resolutions for the respective facies.

Using FIB-SEM (FIG. 4g), two small areas from $F_2$ and $F_3$ in FIG. 4d, are further digitized in (306) and reconstructed in (307). The reconstruction module uses the same suite of algorithms as (302), though the specific algorithms depend on the imaging method and the nature of the imaging data acquired. A 2D slice and 3D digital representation of organic rich $F_2$ are shown in FIGS. 4h and 4i. Mineral rich $F_3$ with small inter-granular porosity and micro-fractures are illustrated in FIGS. 4e and 4f.

For each facies, a pore-scale simulation module (308) will produce the physical properties, specifically permeability, capillary pressure, and 2P/3P relative permeability. These properties are distributed into the 3D facies reconstruction (302) from low resolution imaging, to obtain facies property distribution (309). Upscale facies simulation module (310) is then engaged to produce effective property of the sample (311).

In some embodiments, an iterative approach for microstructures with multiple hierarchies can be necessary.

B. Imaging and 3D Reconstruction

One feature of the disclosed subject matter herein is the image-based simulation. Hence, imaging and image data are critical inputs to a 3D facies reconstruction (FIG. 3, 302) and a subfacies reconstruction (FIG. 3, 307).

Figure 5:
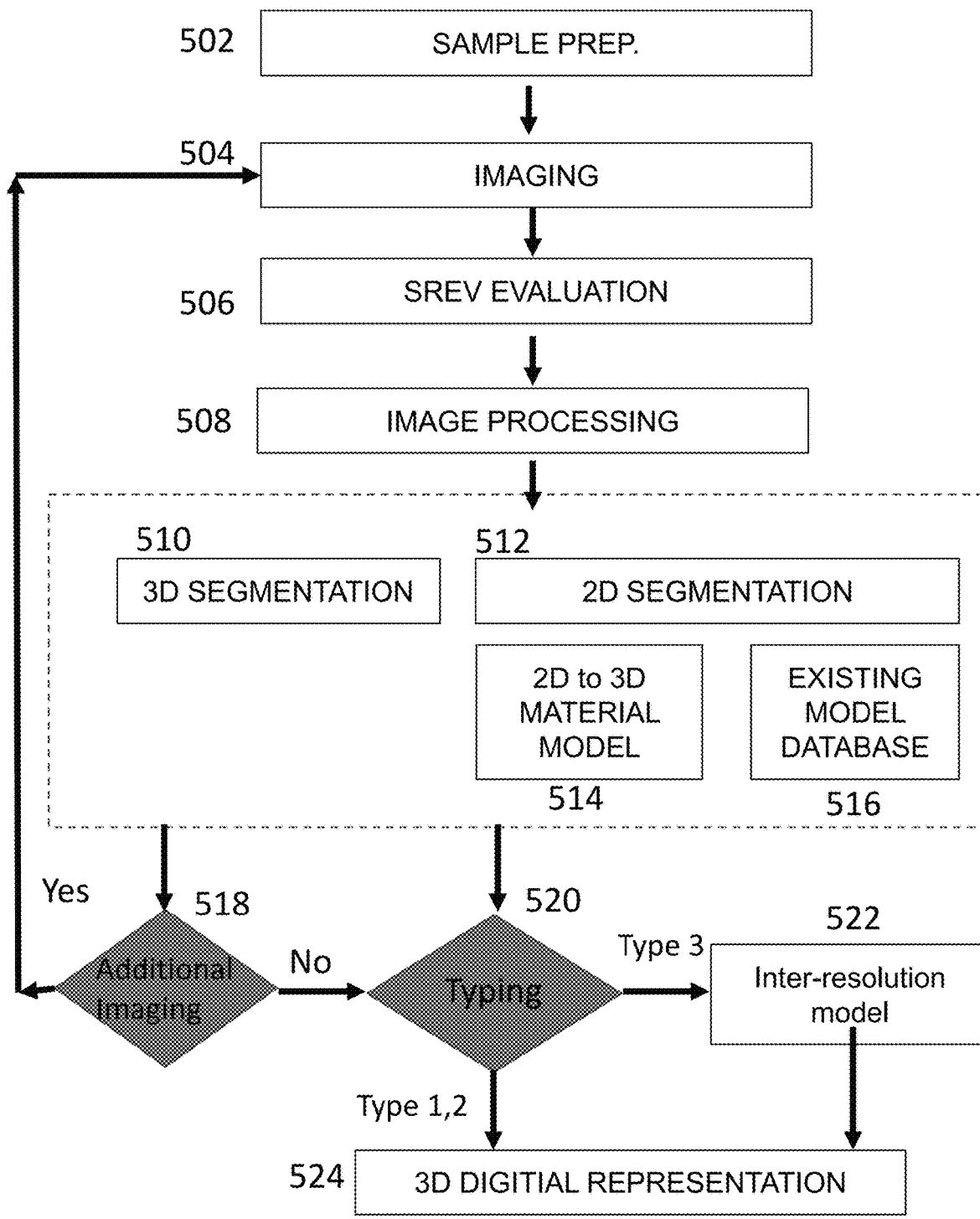
FIG. 5 is a schematic of a 3D reconstruction module according to certain embodiments of the disclosed subject matter herein.

FIG. 5 illustrates the imaging module and the 3D reconstruction module. Sample preparation (502) is important to obtaining high quality images. The specific procedure depends on the imaging method (504). For example, in MicroCT, the sample is subject to rotation over an extended period of time (5-20 hours). The sample has to be stabilized on the stage without any instability which can be caused by X-ray heating, residue mechanical stress from the epoxy or glue used for sample fixture, or rotation motion. In field emission electron microscopy platforms, the same stability concerns need to be addressed. Furthermore, a fresh rock sample contains fluid and gas that complicates imaging experiments. Sample cleaning will help to mitigate this issue, but has a downside of losing the original state of the sample, and the risk of damaging the microstructure during the cleaning. Furthermore, for non-conductive samples, coating is often necessary to avoid electron accumulation on the sample surface which will cause charging. [S. Zhang, L. Canter & M. D. Sonnenfeld. Capillary Fluid Dynamics within Unconventional Rocks Investigated by Scanning Electron Microscope, AAPG Bulletin in press.] and [Lyn Canter, Shawn Zhang, Mark Sonnenfeld, Cliff Bugge, Mary Guisinger, and Kim Jones. Primary and Secondary Organic Matter Habit in Unconventional Reservoirs. in T. Olson, ed., Imaging Unconventional Reservoir Pore Systems: AAPG Memoir 112, p. 9-24.] have extensively discussed these concerns, and how to either avoid them or take advantage of them.

According to certain embodiments of the disclosed subject matter, the determination of the REV (506) is important, as physical properties and the engineering decisions entailed can be scale dependent. For example, in petroleum reservoir systems, data supports the interpretation that in many regions lateral continuity of bed properties can be in the order of the kilometer drainage area scale of a horizontal well (i.e., the system can be described as a "layer-cake" for a well drainage area). However, due to millimeter-scale interbedding and vertical succession of beds of different properties, vertical heterogeneity over the scale of a meter can range from low to high with property differences of up to ±50% of the full range of the property evident in some intervals. The controlling pore throat for hydrocarbon mobility can be in the order of 100 nanometers. The required methodology for upscaling properties can be complex and vary with the nature and distribution of horizontal and vertical heterogeneity at different scales. It is not always possible to define a minimum representative elementary volume at a single scale. Above a single scale properties become scale-invariant or constant. In this setting, it can be more useful to define properties at an appropriate finer scale and apply them within a multi-property cellular model where only statistical REVs (SREV) are practical.

A method according to certain embodiments of the disclosed subject matter herein computes properties on samples of a sufficient size to be a REV (or larger than a REV if convenient) for that property and representative of objects that can be meaningfully and practically assigned to cells at lower resolution digital representations for larger samples. In the example of geoscientific studies, because it is possible to use data at the core-plug scale in the geomodel and upscale, as needed, to reservoir scale, measurement of properties at the core-plug scale is sufficient.

The size of an SREV can vary among different properties. SREV can increase with the increasing heterogeneity of the property. In a porous material, the REV for porosity can be smaller than the REV for permeability (which introduces the pore throat size distribution and sequence of sizes across a sample), which can be smaller than the REV for 2-phase relative permeability (which introduces saturation distribution), which can be smaller than the REV for 3-phase relative permeability (which introduces small volumes of oil saturation).

The question of how a petrophysical measurement fits within a larger scale of interest exists for all scales of petrophysical measurement including FIB-SEM (nanometer-micrometer), μCT (micrometer-millimeter), core (nanometer-centimeter), wireline logs (micrometer-meter), well rate/pressure analysis (meter-hundreds of meters), and field-scale analysis (hundreds of meters-kilometers). The scale-dependence of properties in full reservoir systems and the required methodology for upscaling properties varies with the nature and distribution of horizontal and vertical heterogeneity at different scales. Methodologies for upscaling core-scale properties to reservoir scale have been thoroughly investigated and form the basis for much reservoir modeling. Questions about upscaling of image based rock physics (IBRP) properties to core scale are analogous. For IBRP, a fundamental question is do the IBRP-scale properties represent properties at the core scale and, if they do not, how do we upscale IBRP properties to the core scale?

Using the definition of Bear (1972) a Representative Elementary Volume (REV) is the minimum volume above which the variance in the property of interest is less than a defined value. Properties can include, for example, porosity, permeability and other multiphase flow properties, saturation, and other physical and chemical properties. The IBRP methodology used to characterize a representative property can be classified as being one of three types (Table 1) based on: 1) whether property region (where a property region is a volume of invariant or constant property at the REV scale) locations are known, and 2) whether the region property can be characterized at the REV resolution.

TABLE 1 classification of micro-structure heterogeneities with regard to REV resolution.

| Phase Location | Property | |
| --- | --- | --- |
| | Property can be characterized at REV resolution | Property cannot be characterized at REV resolution |
| Location Known | Type 1 | Type 2 |
| Location Unknown | N/A | Type 3 |

The disclosed subject matter includes a method to determine whether the micro-structure system is a (Type 1), fractal heterogeneous porous system (Type 2), and heterogeneous porous system with inter-resolution features (Type 3).

Type 1—homogeneous system, where REV contains one or more property regions where the locations of all regions within the REV are known, and the properties for all regions can be characterized at the REV resolution (e.g., all grains, pore bodies, and pore throats are characterized at the REV resolution). One example of Type I system is Niobrara chalk, shown in FIG. 6a. REV is captured with single FIB-SEM resolution at 10 nm.

Type 2—fractal heterogeneous porous system, where REV contains multiple property regions where the locations of all regions within the REV are known and where one or more region properties cannot be characterized at the REV resolution. For these regions, the regional property must be measured independently (e.g., characterized independently at a resolution sufficiently fine for a Type 1 methodology to be applicable) and assigned as a pseudo-property to the region at the REV scale (e.g., a dual porosity rock where one porosity is resolvable and the location of the microporous regions are known but the microporosity is not resolvable at the REV resolution). One example of Type II system is Codell sandstone, shown in FIG. 6b. REV is captured with MicroCT at 4 um resolution, which resolved intergranular porosity, one of three fractal porosity systems. Two other porosity systems are resolved with FIB-SEM at higher resolution, 5 nm (FIG. 6b.1) and 20 nm (FIG. 6b.2) respectively. Their respective petrophysical properties will need to be upscaled to the corresponding facies identified in MicroCT, FIG. 6b.

Figure 6:
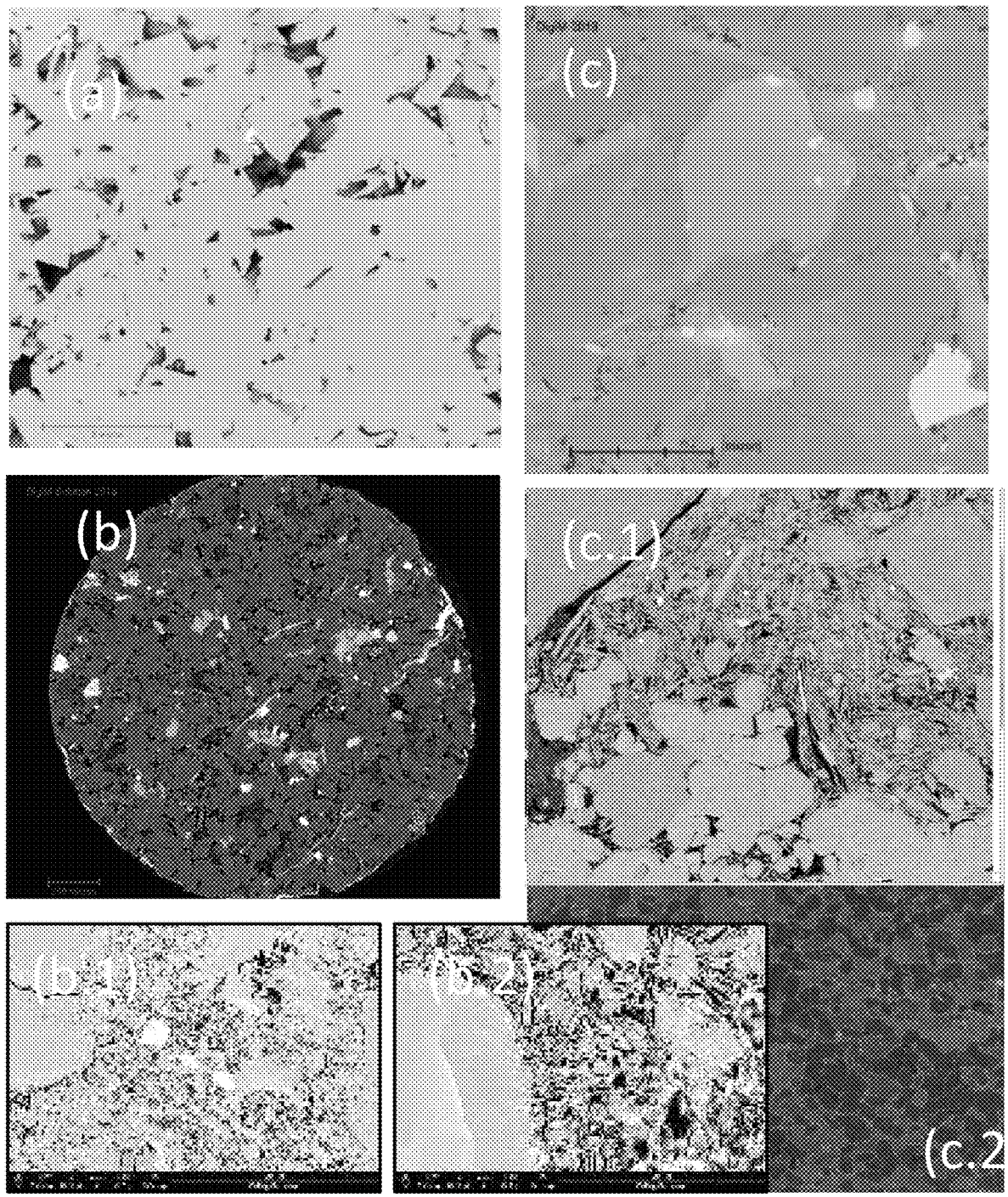
FIG. 6 shows examples of micro-structure systems according to Table 1. (a). Type 1, porous micro-structure Representative Elementary Volume (REV) is captured with a single FIB-SEM resolution. (b). Type 2, porous micro-structure REV is captured with MicroCT at low resolution, while two fractal micro-porosity are captured with FIB-SEM at high (b.1) and intermediate resolution (b.2). (c). Type 3, where REV is captured with MicroCT at low resolution, one fractal micro-porosity is captured with FIB-SEM at high resolution (c.1), and inter-resolution features (fractures) are modeled (c.2).

Type 3—heterogeneous porous system with inter-resolution features, where REV contains multiple property regions where the locations of one or more regions within the REV are not known and where one or more region properties cannot be characterized at the REV resolution. For these regions, the region property must be measured independently (e.g., characterized independently at a resolution sufficiently fine for a Type I methodology to be applicable) and assigned as a pseudo-property to the region at the REV scale. Because of region location uncertainty, property region assignment to locations must be based on some methodology and the accuracy of the architecture constructed must be tested against an independent measurement of the pseudo-property at the REV scale or larger (e.g., a rock where grain and pore bodies are resolvable but pore throats are not and must be independently measured and assigned to locations connecting pore bodies using a defined methodology). FIG. 6c shows an example of fractured tight rock. REV is captured with MicroCT at 3 um resolution. The clay micro-porosity is resolved with FIB-SEM at 5 nm resolution (FIG. 6c.1). Micro-fracture network, requiring FIB-SEM resolution and MicroCT REV, are inter-resolution features that need inter-resolution model (FIG. 6c.2, described in section E.)

Another important decision that needs to be made during the imaging experiment (504) is whether to use 2D or 3D. 3D imaging has been the preferred method in most of the literature and patents quoted, as it is essential to model the transport phenomenon. Hence, it is a component of certain embodiments of the disclosed subject matter herein. However, 3D imaging is costly, lengthy, and produces massive amounts of data. Hence, there are scenarios that 3D imaging is either impossible or undesirable. In this case, 2D images will be collected for cost, time or data efficiency, which makes module 512, 514 and 516 necessary.

The collected images are in grayscale or color. They encode microstructure information that can be extracted with image processing (508). During image processing, artifacts will be removed or reduced, and the imaging contrast will be adjusted suitably for image segmentation.

The segmentation process (510, 512) classifies individual pixels as a material phase. For example, as mineral solid, organic matter, and pore. Most of the existing methods utilize the threshold of the greyscale value, or its gradients, [Leu, L., Berg, S., Enzmann, F., Armstrong, R. T., Kersten, M., 2014. Fast X-ray Micro-22 Tomography of Multiphase Flow in Berea Sandstone: A Sensitivity Study on Image Processing. Transp. Porous Media 105, 451-469. doi: 10.1007/s11242-014-0378-4], which can also be used in certain embodiments of the disclosed subject matter herein. However, for improved automation and accuracy, an artificial intelligence-based image segmentation algorithm (AIBIS) was developed. AIBIS learns from human intelligence which recognizes a feature via not only the greyscale value of pixels, but also their relationships with their surrounding pixels. The collection of the pixels reflects a unique signature of a material in response to the imaging signal as a textural pattern. AIBIS is first trained by a human operator to recognize all the features on a small seed image. Once the training on the seed image is considered satisfactory, the trained image segmentation logic can be populated to not only all the images in the current sample, but also images collected under the calibrated imaging condition on different samples with similar material phases. [S. Zhang., DigiM Artificial Intelligence Image Processing. DigiM Technology Highlight 2017 July Issue. Jul. 29, 2017.]

If 3D imaging data was collected, a three-dimensional digital representation (524) can be reconstructed directly from 3D segmentation results (510) from AIBIS.

If only 2D imaging data was collected and segmented (512), two approaches can be used to reconstruct the 3D digital representation. In 2D to 3D material model approach, information from 2D images is utilized to generate a 3D digital representation. For example, [U.S. Pat. No. 8,908,925, Methods to build 3D digital models of porous media using a combination of high- and low-resolution data and multi-point statistics] used multi-point statistics. [Arka Lahiri, Chandrashekhar Tiwary, Kamanio Chattopadhyay, Abhik Choudhury, Eutectic colony formation in systems with interfacial energy anisotropy: A phase field study, Computational Materials Science, Volume 130, 1 Apr. 2017, Pages 109-120] used phase field function, which is further applied to rock images [Cheney C. Y. Zhang. Reconstruction of Three-Dimensional Micro-Structures From Two-Dimensional Microscopic Images Using Texture Synthesis and Phase Field Method. Poster ID PDP-54.]. These approaches can reconstruct a 3D digital representation from one or multiple 2D images.

An alternative approach is using the image-based database already established (516). By quantifying 2D images, statistically similar rock can be retrieved from the database, and modified appropriately to compute the properties.

The SREV evaluation method, (506), along with 3D segmentation method, (510), or 2D image-based methods, (514, 516), generate the 3D digital representation candidate. An assessment on whether all the features are captured determines whether additional imaging is necessary (518). If additional imaging is necessary, module 504 will need to be repeated with appropriate imaging modality and resolution, followed by succeeding modules. If additional imaging is unnecessary, all data has been collected to perform SREV typing (520). For type 1 and type 2 systems, 3D digital representation can be readily reconstructed (524). For type 3 system, an inter-resolution module (522) is needed, before 3D digital representation (524) can be reconstructed.

C. Relative Permeability Simulation Module at One Specific Resolution

When the resolution is sufficient to resolve all pores and pore throats, relative permeability can be directly computed, as shown in FIG. 3 304 and FIG. 3 308. Identical workflows are adopted as shown in FIG. 7.

Through the pore space reconstructed from 3D digital representation (701), absolute permeability can be computed (702). Absolute permeability can be computed with pore network models, Lattice Boltzmann Method, and the computational fluid dynamic (CFD) method. When the CFD method is used, voxel representation of the pore space can be simplified into smooth surface geometry which is further used to generate the unstructured finite element or the finite volume mesh. Conventional CFD solvers, such as Fluent, CFX, StarCCM, Comsol, OpenFoam, use this approach. Alternatively, a voxel-based direct CFD solver, used in certain embodiments of the disclosed subject matter herein, solves the Navier-Stokes equations directly on voxels. The latter approach is the most optimal as it provides efficiency in both time and cost while also maintaining a large enough REV. As an example, a 3D digital representation with 1000×1000×1000 voxels will require a high performance computing cluster to run for months in a surface geometry approach while a voxel-based CFD can solve it in hours on a desktop workstation. This time efficiency is critical in the practicality of certain embodiments of the disclosed subject matter herein which may require dozens or hundreds of such simulations.

In certain embodiments of the disclosed subject matter herein, a voxel based CFD simulation module uses finite volume spatial discretization. The Navier-Stokes equations are then solved with an implicit pressure explicit momentum scheme (Versteeg and Malalasekera, 2007, Versteeg, H., Malalasekera, W., 2007, An introduction to computational fluid dynamics: The finite volume method (2 Edition). Pearson Education Limited.), $$\nabla \cdot u = 0$$

$$\nabla' p = \mu \nabla^2 u - (u \cdot \nabla) u + f \quad [\text{Eq. 2}]$$

where u is the fluid velocity vector, p is the pressure, μ is the dynamic viscosity, and f is the body force vector which is set to zero in the simulations reported in this paper. The boundary conditions of the cubic computational domain are specified on the four faces that are perpendicular to the flow direction, and on the interior wall of the pore space, no-flow boundary conditions are used. On the two faces that are parallel to the flow direction, pressure inlet and outlet are specified.

Simulations are conducted on a distributed-memory, parallel cluster that has an easy-to-use web interface. After the pressure and velocity fields are solved, Darcy's law is used to evaluate the absolute permeability for all three directions.

$$k_n = u_n \frac{\mu \Delta x}{\Delta p} \quad [\text{Eq. 3}]$$

where n denotes the direction of flow, $\Delta x$ and $\Delta p$ are length and pressure drop across the sample respectively.

Using volume averaging, tensor forms of Equations 4 and 5 can be derived using periodic boundary conditions (Whitaker, S., 1999, *The Method of Volume Averaging*, Kulver Academic Publishers.). The resulting intrinsic permeability tensor, K, does not depend on the flow conditions and describes the anisotropy of the system. Validation results against theoretical models and standard glass bead packaging models are comparable to previous efforts using similar approaches [Zhang, S., Klimentidis, R. E. & Barthelemy, P., 2011, Porosity and permeability analysis on nanoscale FIB-SEM tomography of shale rock, *Society of Core Analysis 2011 Symposium*, paper A080, Austin, Tex., Sep. 18-21, 2011.]

When scalar permeability is needed, the intrinsic permeability tensor collapses into a scalar by taking the three eigenvalues, $k_{e0}$, $k_{e1}$, and $k_{e2}$ derived from the permeability tensor using:

$$k_{mag} = \sqrt[2]{k_{e0}^2 + k_{e1}^2 + k_{e2}^2} \qquad [\text{Eq. 4}]$$

The CFD approach to compute permeability is a direct numerical simulation using a finite volume discretization technique. In comparison, a PNM approach is a reduced order modeling with simplifications both in pore geometry, and consequently, in numerics. It is important to note that confining stress needs to be considered as necessary.

An independent simulation on 3D digital representation is capillary pressure simulation (703). A parallel porosimetry simulation solver, based on the method described by Hilpert and Miller (2001) [Hilpert, M., & Miller, C. T., 2001, Pore-morphology-based simulation of drainage in totally wetting porous media. *Advances in Water Resources*, 24(3-4), 243-255.] was utilized to digitally measure drainage capillary pressure. Shikhov and Arns (2015) [Shikhov, I., and Arns, C. H., Evaluation of capillary pressure methods via image-based simulations, Transp Porous Media, v 107, p. 623-640.], compares experimental and digital capillary pressure methods. Fundamentally, this method involves an invasion of the 3D digital image pore volume with spheres of a successively smaller diameter. The size of the spheres correspond to invasion pressures through the Washburn relation (1921) [Washburn, E. W., 1921, Note on a method of determining the distribution of pore sizes in a porous material: Proceedings of the National Academy of Science, v. 7, n. 4, p. 115-116.]:

$$D = 4C\sigma\cos q/Pc \qquad [\text{Eq. 5}]$$

where Pc=capillary pressure (psia), C=0.145 (constant with unit (psia·cm·μm)/dyne), θ=contact angle (140 degrees for air-Hg), σ=interfacial tension (484 dyne/cm for air-Hg), and D=pore-throat diameter (μm, microns).

In addition to the drainage-cycle modeling, a newly developed imbibition-cycle solver was also utilized [DigiM Porosimetry Validation Page. http://www.digimsolution.com/products/image-simulation/porosimetry/, visited Mar. 31, 2017.].

A single-phase stationary approach is used to compute relative permeability. Relative gas permeability ($k_{rg}$) data for low-permeability rocks has been reported in some earlier studies ([Byrnes, A. P., Sampath, K., and Randolph. P. L., 1979, Effect of pressure and water saturation on the permeability of western tight sandstones; Proc. 5th Annual DOE Symposium Enhanced Oil and Gas Recovery, August 22-26, Tulsa, Okla., p. 247-263.], [Jones, F. O., and W. W. Owens, 1980, A laboratory study of low-permeability gas sands: paper SPE 7551-PA, Journal of Petroleum Technology, v. 32, no. 9, p. 1631-1640. DOI: 10.2118/7551-PA.], [Byrnes, A. P., 1997, Reservoir characteristics of low permeability sandstones in the Rocky Mountains, The Mountain Geologist, v. 34, no. 1, p. 39-51], [Byrnes, A. P., and Castle, J. W., 2000, "Comparison of Core Petrophysical Properties Between Low-Permeability Sandstone Reservoirs: Eastern U.S. Medina Group and Western U.S. Mesaverde Group and Frontier Formation": SPE 60304 proceedings of the 2000 SPE Rocky Mountain Regional/Low Permeability Reservoirs Symposium held in Denver, Colo., 12-15 Mar. 2000, p. 10], [Byrnes, A. P., 2005, "Permeability, capillary pressure, and relative permeability properties in low-permeability reservoirs and the influence of thin, high-permeability beds on production", in "Gas in Low Permeability Reservoirs of the Rocky Mountain Region", Rocky Mountain Assoc. of Geologists 2005 Guidebook CD, M. G. Bishop, S. P. Cumella, J. W. Robinson, and M. R. Silverman eds., p. 69-108], [Byrnes, A. P., Cluff, R. C., and Webb, J. C., 2009, Analysis of Critical Permeability, Capillary and Electrical Properties for Mesaverde Tight Gas Sandstones from Western U.S. Basins, U.S. Department of Energy Final Technical Report for Project #DE-FC26-05NT42660, DOI 10.2172/971248, 248 pgs.]). All of the gas relative permeability studies cited utilized the single-phase stationary method where water saturation is held constant and the relative permeability to the non-wetting gas or oil phase is measured. Dacy (2010) [Dacy, J. M., 2010, Core tests for relative permeability of unconventional gas reservoirs, SPE 1235427, SPE Annual Technical Conference and Exhibition, Florence, Italy, Sep. 19-22, 2010, 18 pgs.] reviews methods for measuring relative permeability in unconventional rocks. Because of the experimental difficulty presented by high capillary pressure end effect in low-permeability core measurements, few water relative permeability measurements have been published and there no publications on multiphase flow data that are known to exist for permeabilities below 0.1 mD.

Jones and Owens (1980) reported that water permeability is progressively less than Klinkenberg gas permeability with decreasing permeability for Kik<1 mD following the general equation:

$$Kw = Kk^{1.32} \qquad [\text{Eq. 6}]$$

where Kk=absolute Klinkenberg permeability, mD, and Kw=water permeability, mD.

For water permeability, Ward and Morrow (1987) [Ward, J. S., and Morrow, N. R., 1987, Capillary pressure and gas relative permeabilities of low permeability sandstone: Society of Petroleum Engineers Formation Evaluation, September 1987, p. 345-356.] proposed the use of the Corey wetting-phase equation to calculate water relative permeability with values presented relative to $k_k$ by using the ratio of the $k_w/k_k$:

$$Krw = ((S_w - S_{wc})/(1 - S_{wc}))^{ew}(k_w/k_k) \qquad [\text{Eq. 7}]$$

where the exponent ew=4, Sw=water saturation, and Swc=critical water saturation.

Given the experimental difficulty of measuring two-phase water relative permeability in low-permeability rocks, the ability to accurately measure oil relative permeability in the presence of gas and water is extremely difficult.

Image-based rock analysis offers a unique tool for investigating two- and three-phase relative permeability in low-permeability rocks. Unlike real rocks, image-based rocks are not constrained by ultra-low flow rates, confining stress effects, capillary pressure end effect, and the difficulty of reproducibly establishing numerous gas, oil and water saturations in known distributions in the pore system. The Navier-Stokes multiphase flow is difficult to compute, due to numerical instability, computational costs, limited verification possibility in a three-dimensional domain, complexities of physics at pore level, and difficulties in casting the pore level physics into network models. Joekar-Niasar and Hassanizadeh (2012) [Joekar-Niasar, V., and S. M. Hassanizadeh (2012) Analysis of Fundamentals of Two-Phase Flow in Porous Media Using Dynamic Pore-Network Models: A Review, Critical Reviews in Environmental Science and Technology, 42:18, 1895-1976, DOI: 10.1080/10643389.2011.574101.] review 2-phase dynamic pore-network models and Fenwick and Blunt (1998) [Fenwick, D. H., and Blunt, M. J., 1998, Network modelling of three-phase flow in porous media, Soc. Pet. Eng. J., March 1998, p. 86-97.] presented a cubic lattice network model for 3-phase flow to investigate oil film flow. Heiba et al (1984) [Heiba, A. A., Davis, H. T., and Scriven, L. E., 1984, Statistical network theory of three-phase relative permeabilities, SPE/DOE #12690, SPE/DOE Fourth Symposium on Enhanced Oil Recovery, Tulsa, Okla., Apr. 15-18, 1984, p 121-134.] presented a statistical network theory analysis of 3-phase flow.

These models are potentially important since direct measurement of three-phase properties, particularly for every type of possible displacement process, is very difficult. The almost universal practice in the oil industry is to estimate three-phase relative permeability from two-phase data using empirical models that have little or no physical basis. An alternative approach is to develop physically-based three-phase network models that incorporate all the pertinent pore-scale mechanisms and which are tuned to match available two-phase data. However, as with the rock studies cited above, it is also possible to perform quasi-static Navier-Stokes flow calculations on single phases while maintaining the other phases stationary.

Figure 8:
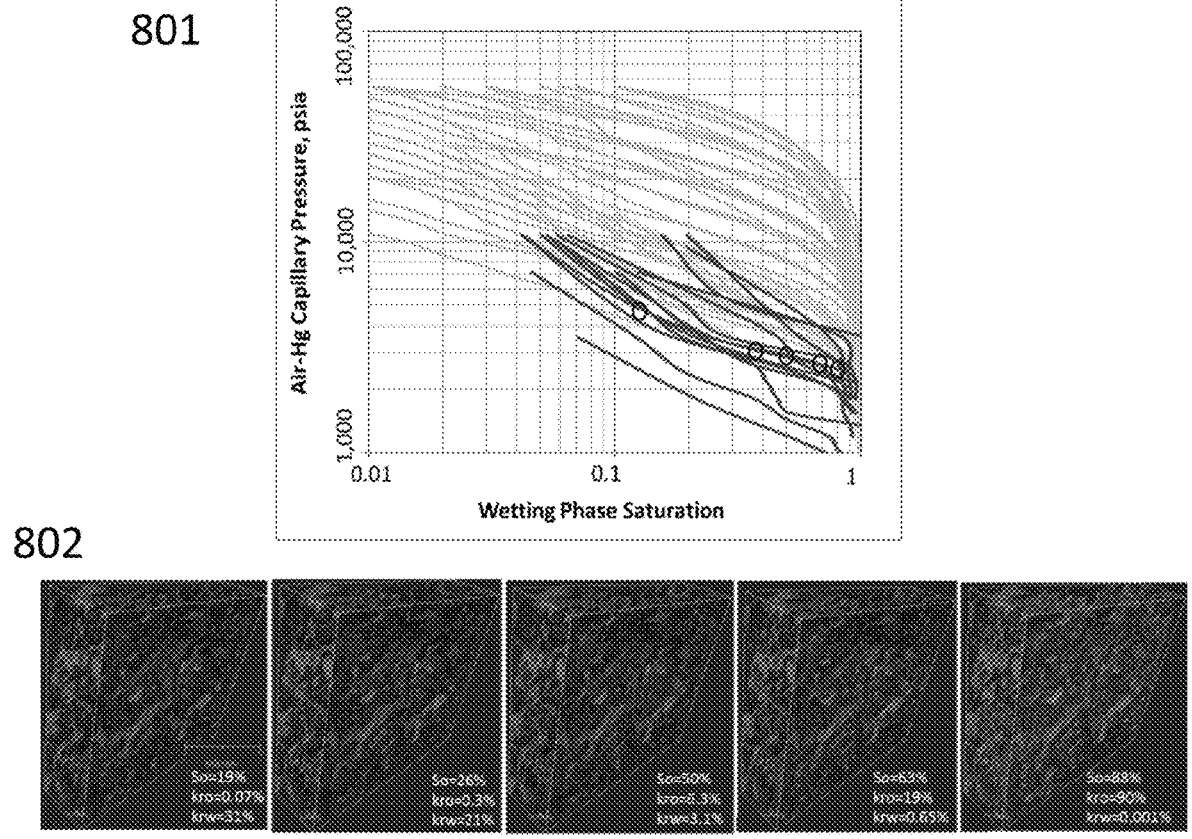
FIG. 8 illustrates capillary pressure simulation results and intermediate saturations used for a two-phase relative permeability calculation. The lower panel (left to right) shows intermediate saturations corresponding to the blue circles on the curve (right to left).

While capillary pressure simulation (703) produces a capillary pressure curve, as exampled in FIG. 8 (801), it also generates all intermediate saturation states (802). At each saturation state, the nonwetting phase and wetting phase occupies certain pore space. Four of these states are illustrated in FIG. 8 (802). Two absolute permeability simulations can be performed for each state, one for the nonwetting phase and one for the wetting phase (FIG. 7, 705). These two absolute permeabilities at a saturation state are then divided by the absolute permeability of the total pore space, and produce one pair of relative permeability for this saturation state (706). The absolute permeabilites for all n saturation states are calculated, and converted to relative permeability in this manner. Two-phase relative permeability curves are produced.

This method offers the unique advantage that water relative permeability can be calculated for the complete series of saturations and can be computed at saturations as low as Sw=12% and Krw=0.001% in the example and theoretically as low as the limiting critical percolating saturation. This digital methodology also offers precise control of the saturation distribution as defined by the drainage capillary pressure curve. Note that this quasi-static method does not handle the effects of dynamic forces at fluid-fluid interfaces. A dynamic multiphase flow solver can be used as an alternative at the expense of dramatic computing time increase (from hours to years) and REV reduction (from billions of pixels to that diminishes the practical application interests.

Digital computation of three-phase relative permeability extends the quasi-static, single-phase stationary methodology used for two-phase relative permeability. When three phases are present, for a drainage condition in a water-wet rock, where oil displaces water under drainage conditions and gas displaces oil under drainage conditions, the gas and water Krg and Krw curves are defined independently and only by gas saturation (Sg) and water saturation (Sw), respectively. Under this condition, the two-phase Kr curves translate to the ternary three-phase space as straight lines where the isoperm line is constant for a given saturation of the phase irrespective of the changing saturations of the other two phases.

Figure 9:
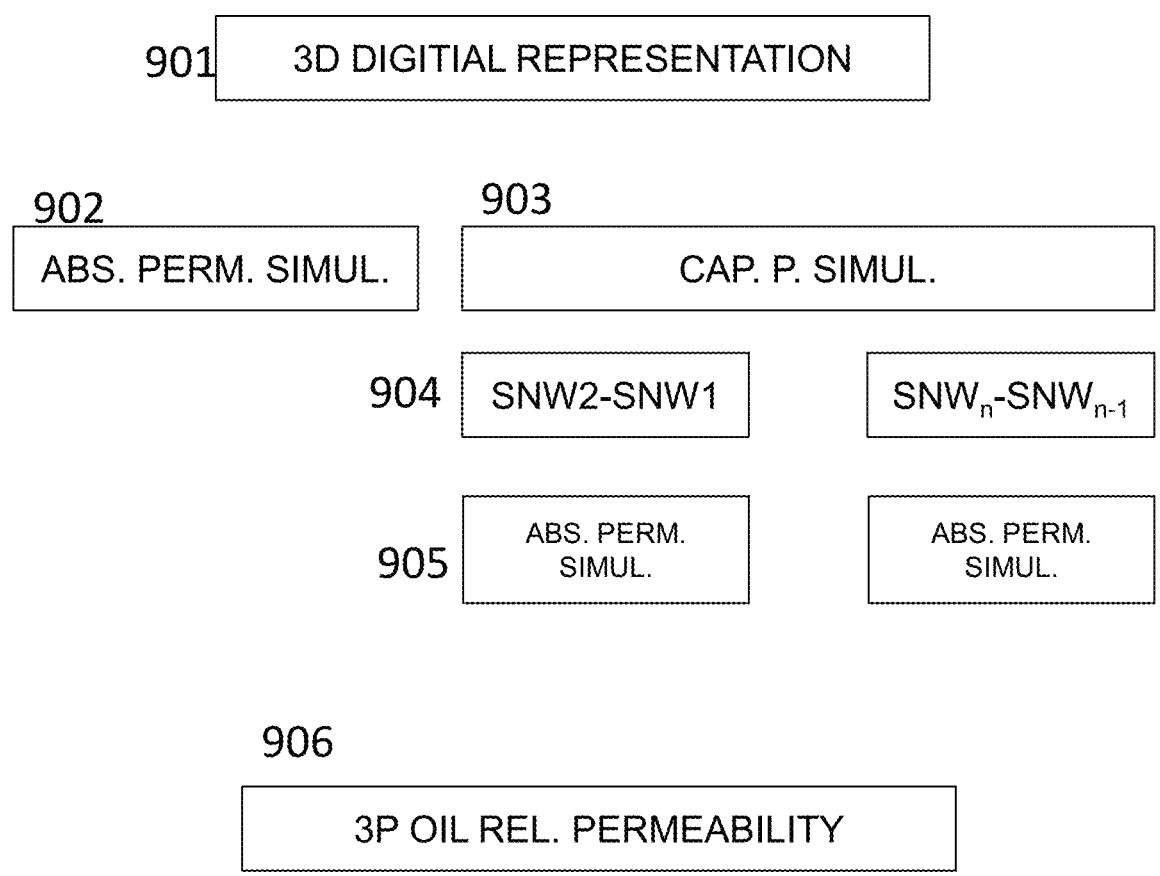
FIG. 9 is a schematic of a simulation module for three-phase relative permeability according to certain embodiments of the disclosed subject matter herein.
Figure 14:
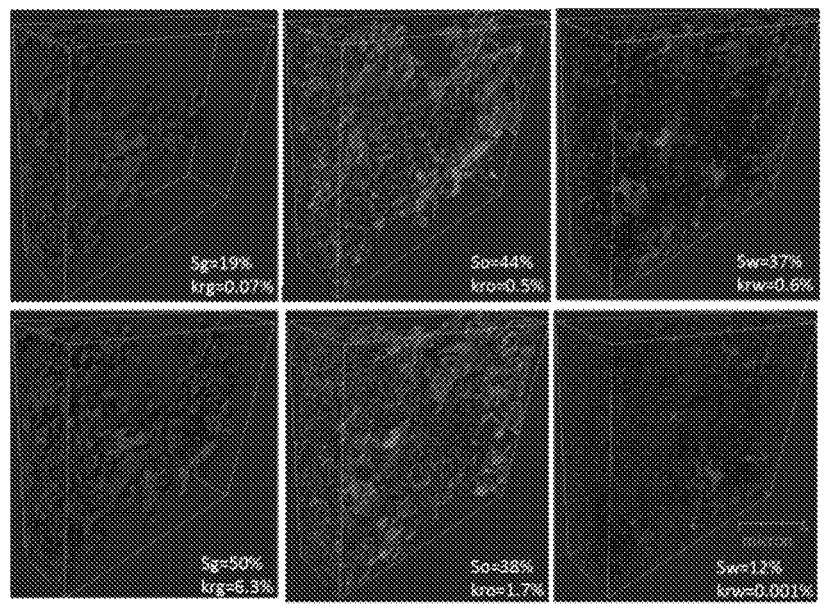
FIG. 14 illustrates one intermediate saturations used for a three-phase relative permeability calculation.

FIG. 9 shows the workflow diagram of a stationary three-phase relative permeability calculation for oil. The workflow is almost identical for FIG. 7, except (904) where the oil saturation is first discounted from the gas saturation determined from the previous drainage step. The gas phase saturates the largest pore first and gas-oil follows the identical capillary pressure curve as oil-water. A series of three-phase oil saturation distributions can be determined by constructing all saturation states where the gas-oil capillary pressure is less than the oil-water capillary pressure. To obtain proper drainage distribution of gas, oil and water saturations, the observed successive increasing equivalent pressure distributions is followed. Under drainage conditions, oil saturation is distributed in the pores that lie between those occupied by water at a defined capillary pressure and the pores occupied by gas, defined by the gas-oil drainage capillary pressure curve. At each three-phase oil saturation, the effective permeability to oil is calculated and divided by the absolute permeability to provide a three-phase oil relative permeability. FIG. 14 illustrates three-phase saturation distributions for two saturation states in a sample. As with digital two-phase relative permeability calculations, the digital three-phase relative permeability computations provide unique capabilities to investigate three-phase relationships that would be almost impossible for actual rock experiments. These computations also allow definition of three-phase diagrams (e.g., FIG. 2) under ideal drainage conditions.

D. Upscale Facies Simulation Modules

Multi-scale data needs to be integrated appropriately to derived effective properties at a larger scale for Type 2 and Type 3 REVs. As a simple example, porosity, $\phi$, can be upscaled in the following manner, $$\emptyset_{eff} = \Sigma_{F=1}^{n} vf_F * \emptyset_F \qquad [\text{Eq. 8}]$$

Where, $\emptyset_{eff}$ is upscaled effective porosity; $vf_F$ volume fraction of a facies in the sample; $\emptyset_F$ is porosity of a facies.

When a single resolution is needed, pore space is fully resolved, hence n=1, and, $\emptyset_{eff} = \emptyset_F$.

When multiple resolutions are needed, and there are three facies, n=3, as illustrated in FIG. 4, assuming,

| F | Description | $vf_F$ | $\emptyset_F$ |
|---|---|---|---|
| 1 | Intergranular Porosity | 0.05 | 1.0 |
| 2 | Organic Porosity | 0.7 | 0.2 |
| 3 | Intragranular Porosity | 0.25 | 0.03 |

Effective porosity is $\emptyset_{eff}$=0.05*1.0+0.7*0.2+0.25*0.03=0.1975, or 19.75%.

While porosity can be upscaled with simple arithmetic, permeability and capillary pressure upscaling are more involved.

Figure 10:
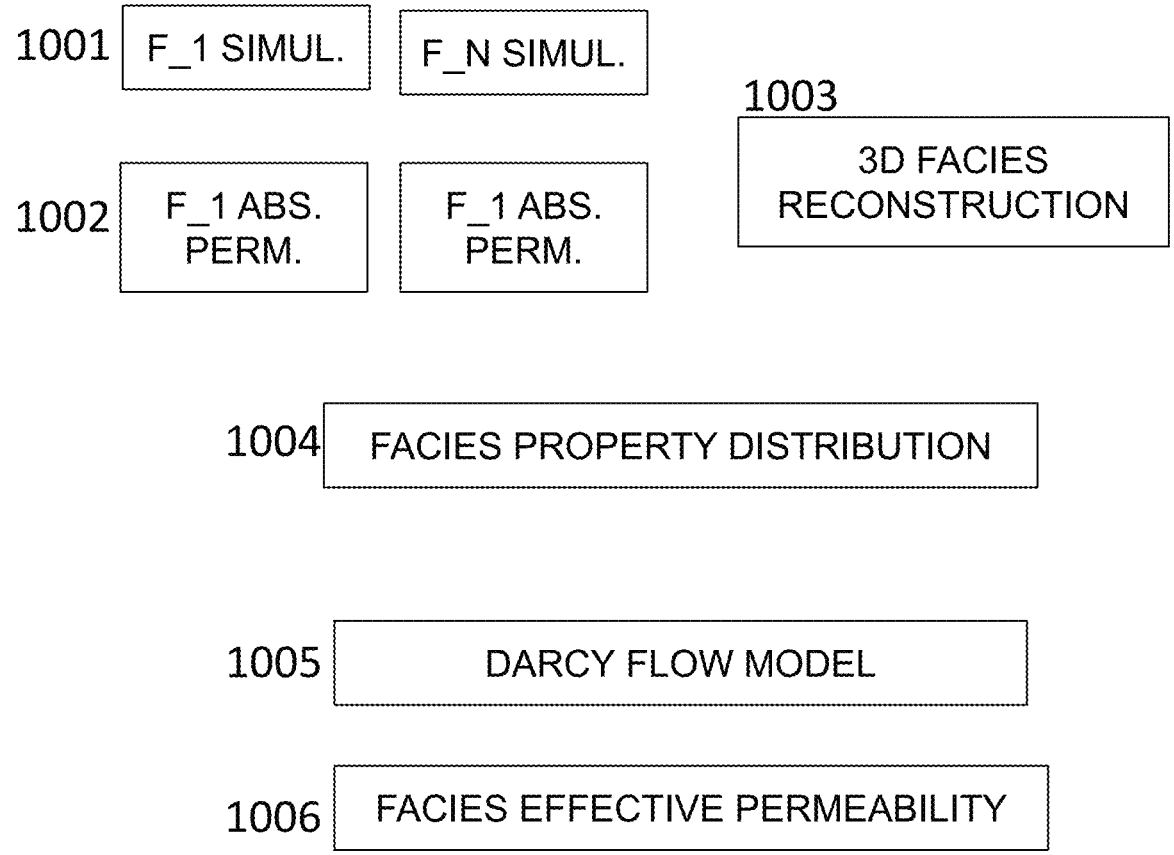
FIG. 10 is a schematic of an upscaling simulation module for absolute permeability according to certain embodiments of the disclosed subject matter herein.

For permeability upscaling, a Darcy flow model is used in the workflow illustrated in FIG. 10. Facies permeabilities from high resolution 3D digital representation (1002) are distributed into the low resolution 3D facies reconstruction (1003). Homogenized single phase, multi-facies Darcy transport equation, Eq. 9, is used to compute velocity and pressure distribution in the low resolution 3D facies reconstruction, $$\phi(F)\frac{\partial \rho}{\partial t} + \nabla \cdot \rho u = 0;$$ [Eq. 9]

$$u = -\frac{K(F)}{\mu}(\nabla p + \rho g H)$$

Where Ø(F) is facies dependent porosity, K(F) is facies dependent permeability tensor, g is gravity, and H is the height. Both Ø and K are spatial variables determined from facies property distribution (1004).

The upscaled permeability is typically not an arithmetic relationship of the facies, except in the case of simple geometries, such as parallel or serial layered cake and spherical inclusions. The simple geometries can be used to validate whether the numerical implementation of Darcy flow model is correct.

The relative permeability upscaling made the following assumptions,

Only percolating facies contribute to effective permeability, except intergranular porosity. Percolation of a facies is defined as the voxels are interconnected from one exterior surface of the sample to the opposite exterior surface, along at least one direction of the sample. In theory, non-percolating facies have an impact on permeability, which is often minor and negligible in practice. Intergranular porosity is considered separately as it can be the initial gas host in three-phase scenario.

The fluid phase preferentially saturates one facies. For example, in a water wet rock, water will saturate the smallest pores (such as those with diameters in a few 10s nm to 100 nm often found in clay mineral) first, then intermediate pores (e.g., kaolinite "book" pores that are a few hundred nanometers), and then the largest pores (e.g., intergranular pores that are a few micrometers or larger). Conversely, oil will first desaturate from the largest pores and then from the intermediate pores. Oil can continue to desaturate from the smallest pores (if they managed to migrate in there to the first place) in theory, but in practical reservoir conditions, it is difficult, hence requiring advanced technique in enhanced oil recovery. In a three-phase scenario, gas coming out of solution occupies the largest pores first, such as intergranular porosity. Saturation preference can be the result of fractal hierarchy of the pore space, or wettability heterogeneity. Oil wet and mixed wet conditions requires similar assumptions, though the saturation history is different.

Figure 11:
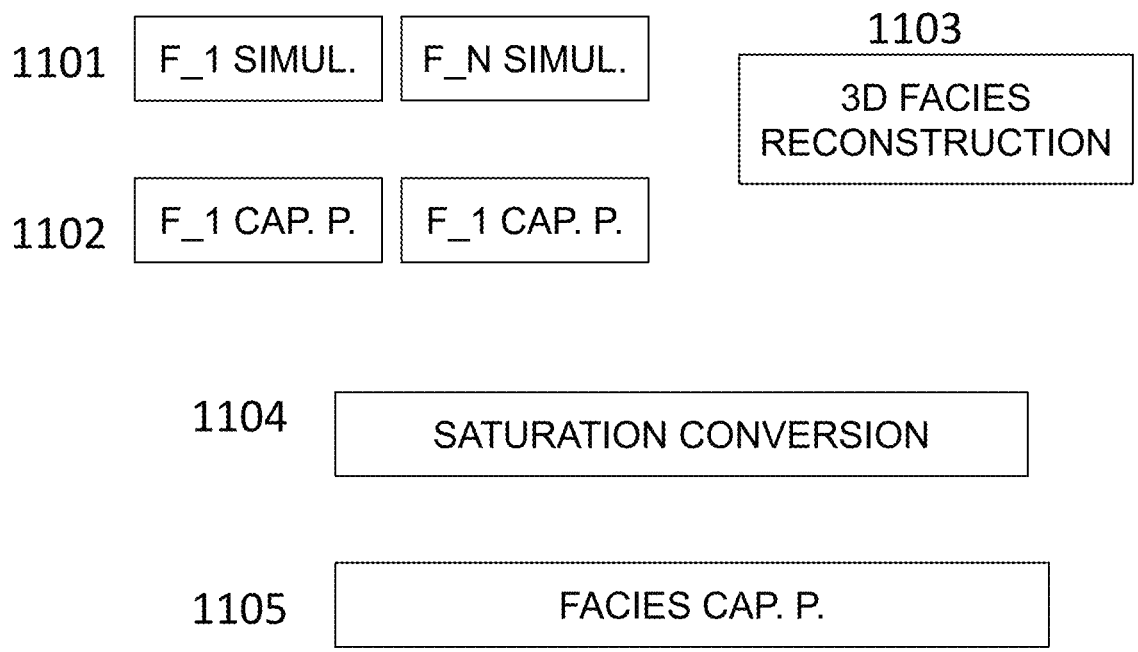
FIG. 11 is a schematic of an upscaling simulation module for capillary pressure according to certain embodiments of the disclosed subject matter herein.

FIG. 11 shows the diagram of capillary pressure upscaling. Each facies capillary pressure simulation produces a saturation-Pc curve (1102). Due to facies preference, each Pc curve covers a range of capillary pressure corresponding to the pore throats of that facies. The corresponding saturations for each facies need to be referenced to the whole sample (1103). The saturation conversion step, (1104), is according to fluid material balance Eq. 10.

$$S_{\mathit{eff}} = \left(S_m \cdot vf_m + \sum_{F=m+1}^{M} vf_F\right) \bigg/ \sum_{F=1}^{M} vf_F$$ [Eq. 10]

Where
$S_{\mathit{eff}}$ is effective saturation at a particular capillary pressure.

$S_m$ is the partial saturation of mth facies, currently being drained, in reference to the porosity of mth facies from high resolution.

$vf_m$ is the volume fraction of mth facies, in reference to the whole sample.

For example, in the multi-facies system illustrated in FIG. 4, oil first desaturates from F1, then from F2, finally from F3. At a given saturation for F2, water saturation is $$S_{\mathit{eff}}(S_2 \cdot vf_2 v + vf_3)/(vf_1 + vf_2 + vf_3)$$ [Eq. 11]

The capillary pressure corresponding to $S_{\mathit{eff}}$ is Pc corresponding to F2 at saturation $S_2$.

When pore size range overlap from different facies overlap, capillary pressure will also overlap. A least-square fit is used to determine the appropriate saturation and pressure value the overlapped range.

Following upscaled capillary pressure curve, upscaled saturation distribution for each facies can be determined, as in FIG. 12 (1204). Using the reverse of Eq. 10, corresponding facies saturation can be retrieved (1205), as well as its corresponding stationary absolute permeability at that facies-specific saturation.

Each facies will then have a stationary absolute permeability (1206). When they are distributed into the 3D Facies Reconstruction (1201), a Darcy flow simulation (1207) can be conducted at that particular saturation. When normalized by the upscaled absolute permeability of the whole sample (1202), which is also computed from a Darcy flow simulation using 3D Facies Reconstruction, an upscaled relative permeability for the current effective saturation is computed. Traversing through all effective saturations with the same methodology will produce relative permeability curves for two-phase flow, and a ternary plot for three-phase flow.

E. Inter-Resolution Model

In accordance with an embodiment of the disclosed subject matter, micro-fractures, as a high aspect ratio microstructures, is discussed as an example of an inter-resolution model. Micro-porosity domains are connected by small fractures, which can have throat aperture in the order of 100 nanometers, but length of 100 micrometers. It is difficult, sometimes impossible, to capture both large enough REV for the fracture network and with high enough resolution to resolve the fracture aperture.

Certain embodiments of the disclosed subject matter herein can relate to an algorithm with the following steps for, as an example, a micro-fracture connected heterogeneous micro-structure material system.

1. MicroCT imaging, capturing mineral grains, IG and MP
2. Slot pore network generations
   2.1. InterM network
   2.2. IntraM network
3. Slot pore network classification algorithm 3.1. Input: IG, InterM, MP
3.2. IG_average_size = 30
3.3. EXTENDED[IG_average_size+1] = 0
3.4. For i=1,IG_average_size
   3.4.1. EXTENDED[i] = Extend(IG, i) && InterM − IG
   3.4.2. For j = 1, i
      3.4.2.1. EXTENDED[i] −= EXTENDED[j]
   3.4.3. EXTENDED_VF[i] = VolumeFraction(EXTENDEDi)
   3.4.4. FULL_NETWORK[i] = MP && IG
   3.4.5. For k = 1, i
      3.4.5.1. FULL_NETWORK[i] += EXTENDED[k]
   3.4.6. FULL_NETWORK_VFi = VolumeFraction(FULL_NETWORKi)
   3.4.7. PERCOLATING_FULL_NETWORK[i] = Percolation(FULL_NETWORK[i])

-continued

```
    3.4.8. PERCOLATING_FULL_NETWORK_VF[i] =
        VolumeFraction(PERCOLATING_FULL_NETWORK[i])
    3.4.9. PERCOLATING_FULL_NETWORK_IG[i] =
        PERCOLATING_FULL_NETWORK[i] && IG
    3.4.10. PERCOLATING_FULL_NETWORK_MP[i] =
        PERCOLATING_FULL_NETWORK[i] && MP
    3.4.11. For m = 1, i
        3.4.11.1. PERCOLATING_FULL_NETWORK_CLASSES
            [i][m] = PERCOLATING_FULL_NETWORK[i] &&
            EXTENDED[m]
```

4. Porosity reconstruction
5. Permeability reconstruction
6. Capillary pressure reconstruction
7. Relative permeability The abbreviations of the algorithm are,
IG: Inter-granular pore
MP: Micro-porosity
InterM: Inter-Mineral
IntraM: Intra-Mineral In accordance with an embodiment of the invention, Step 3.4 used a distance-based classification algorithm. Certain embodiments of the disclosed subject matter herein can also relate to simpler algorithms such as random classification, or more sophisticated algorithms where in addition to distance, connectivity, smallest inscribing sphere, or and local computational physics properties can be used as part of classification schemes.

F. Systems and Software

Figure 13:
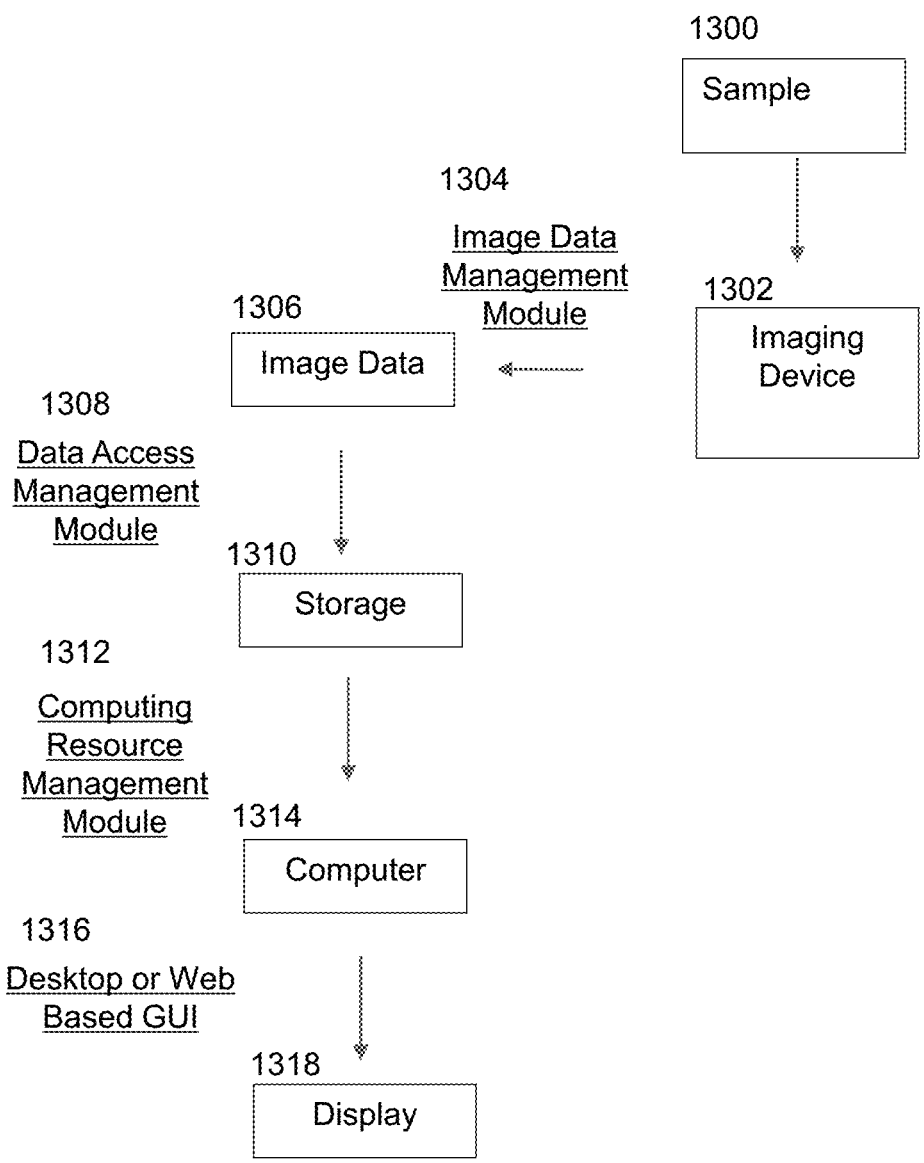
FIG. 13 illustrates a system for computing advanced physical properties for material micro-structures according to certain embodiments of the disclosed subject matter herein.

Certain embodiments of the disclosed subject matter herein can also relate to a system for computing advanced physical properties for material micro-structures which comprises, as shown in FIG. 13, (a). Imaging devices (1302) that is capable of producing images at one or more desirable resolutions and contrast for the specific material sample (1300); the produced image data (1306) can be stored on a storage device (1310), through necessary image data management (1304) and data access management (1308) modules. (b). One or more computers (1314) operable for execute computer programs that, through necessary computing resource management modules (1312), can reconstruct a 3D digital representation of the porous material.

compute absolute permeability, capillary pressure, two-phase relative permeability and three phase relative permeability in single resolution or multi-resolution, upscaling manner.

Store and provide access to imaging data, derived data, and computer programs for previous computing tasks.

(c). A graphical user interface (1316) that allows the user to operate on the aforementioned computer(s), programs and storage, which can be desktop based or cloud based.

(d). A display (1318).

Other embodiments of the disclosed subject matter herein will be apparent to those skilled in the art from consideration of the present specification and practice of the disclosed subject matter disclosed herein. It is intended that the present specification and examples be considered as exemplary only with a true scope and spirit of the disclosed subject matter herein being indicated by the following claims and equivalents thereof.

I claim:

1. A method for computing advanced physical properties of porous materials, comprising:
   a) selecting a sample representative of a porous material;
   b) determining whether single or multiple resolutions are needed to image the sample, the number of resolutions, the number and types of imaging devices needed, and whether an additional inter-resolution modeling is needed;
   c) acquiring three-dimensional images of the sample at a first resolution;
   d) constructing a first three-dimension digital representation of the sample at the first resolution using the three-dimension images of the first resolution, with an additional inter-resolution model when needed;
   e) acquiring three-dimension images of a region of the sample at one or more additional resolutions, wherein the one or more additional resolutions are higher than the first resolution;
   f) constructing one or more additional three-dimension digital representations of the region of the sample at the one or more additional resolutions using the three-dimension images of the one or more additional resolutions;
   g) computing basic physical properties and advanced physical properties of the region using the one or more additional three-dimension digital representations;
   h) upscaling to compute physical properties of the sample using the first three-dimension digital representation constructed at Step (d) and the basic and advanced physical properties computed at Step (g) using the one or more additional three-dimensional digital representation; and
   i) iterating Steps (d) through (h) when necessary.

2. The method of claim 1, wherein the porous material is selected from the list of following: rock, soil, zeolite, biological tissue, electrode, foam, polymer material, wood, cement, ceramic, sand, clay, inorganic compound, organic compound, metal, and other material with micro-structures.

3. The method of claim 1, wherein the images of the first and the one or more additional resolutions are acquired using any one or a combination of the following: imaging log, digital photography, light microscopy, magnetic resonance imaging, ultrasound imaging, x-ray computed tomography, electron microscopy, neutron tomography, Raman imaging, mass spectroscopy imaging, ion microscopy, and other imaging methods.

4. The method of claim 1, wherein the porous material includes one or more of interconnected pores, interconnected particles, interconnected material phases, interconnected chemical compounds, interconnected elements, and other interconnected micro-structures.

5. The method of claim 1, wherein:
   a) the basic physical properties include absolute permeability and capillary pressure,
   b) the advanced physical properties include two-phase and three-phase relative permeabilities, and
   c) the upscaled physical properties include upscaled effective absolute permeability, upscaled effective capillary pressure, and upscaled effective two-phase and three-phase relative permeabilities.

6. The method of claim 1, further comprising:
   a) acquiring two-dimension images of the sample at the first resolution;
   b) constructing the first three-dimension digital representation of the sample at the first resolution using the two-dimension images of the first resolution;
   c) acquiring two-dimension images of a region of the sample at the one or more additional resolutions, wherein the one or more additional resolutions are higher than the first resolution;

d) constructing the one or more additional three-dimension digital representations of the region of the sample at the one or more additional resolutions using the two-dimension images of the one or more additional resolutions;

e) computing the basic physical properties and the advanced physical properties of the region using the one or more three-dimension digital representation;

f) upscaling to compute physical properties of the sample using the first three-dimension digital representation constructed at Step (c) and the basic and advanced physical properties computed at Step (e) using the one or more additional three-dimensional digital representations; and g) iterating Steps (b) through (f) when necessary.

7. The method of claim 6, wherein the first and the one or more three-dimension digital representations are reconstructed from the two-dimension images of the first and the one or more additional resolutions using texture synthesis, multipoint statistics, or pore network modeling.

8. A method for computing advanced physical properties of porous materials based on a type of representative elementary volume (REV) specifically with regard to an imaging approach, comprising:
   a) selecting a sample representative of a porous material;
   b) determining a field of view and a first resolution to be used to acquire images of the sample;
   c) acquiring two-dimensional or three-dimensional images of the sample at the first resolution;
   d) assessing whether all features are captured and determining whether additional imaging is needed;
   e) if additional imaging is needed, acquiring additional two-dimensional or three-dimensional images of the sample at one or more additional resolutions until no additional imaging is needed; and
   f) if additional imaging is not needed, determining a type of the sample using the captured imaging data based on (1) whether locations of property regions are known, and (2) whether properties of each of the property regions can be characterized at the first resolution,
      a. wherein the sample is a Type 1—homogeneous system, where the field of view contains multiple property regions where the locations of all property regions within the field of view are known, and where the properties for the multiple property regions can be representatively characterized at the first resolution,
      b. wherein the sample is a Type 2—fractal heterogeneous porous system, where the field of view contains multiple property regions where the locations of all property regions within the field of view are known, and where the properties for at least some of the multiple property regions cannot be characterized at the first resolution but can be characterized at the one or more additional resolutions, and
      c. wherein the sample is a Type 3—heterogeneous porous system with inter-resolution features, where the field of view contains multiple property regions where the locations of at least some of the multiple property regions within the field of view are not known but can be characterized with an inter-resolution model, and where the properties for at least some of the multiple property regions cannot be characterized at the first resolution but can be characterized at the one or more additional resolutions and the inter-resolution model.

9. The method of claim 8, further comprising: if the sample is a Type 1, capturing the field of view only with the first resolution.

10. The method of claim 8, further comprising: if the sample is a Type 2, determining resolution and field-of-view for each of the multiple property regions, characterizing each of the multiple property regions independently with the one or more additional resolutions, and assigning a pseudo-property computed at the one or more additional resolutions to each of the multiple property regions at the first resolution.

11. The method of claim 8, further comprising: if the sample is a Type 3, determining resolution and field-of-view for each of the multiple property regions, determining an appropriate inter-resolution model, and characterizing each of the multiple property regions independently with the one or more additional resolutions and the inter-resolution model, assigning a pseudo-property to each of the multiple property regions, including the regions defined by the inter-resolution model, at the first resolution.

12. The method of claim 8, further comprising: determining a representative elementary volume (REV) of the sample with regard to an imaging method, the type of the sample, and the physical properties to be characterized.

13. A method for upscaling advanced physical properties, such as relative permeabilities, comprising:
   (a) reconstructing 3D facies of a Type 3 sample (heterogeneous porous system with inter-resolution features) at a first lower resolution, with an appropriate inter-resolution model;
   (b) determining facies permeabilities, capillary pressure and saturation states from one or more higher resolution 3D digital representations using a Navier-Stokes flow model;
   (c) determining permeability contribution of the inter-resolution model;
   (d) determining the influence of capillary pressure, and saturation states of the inter-resolution model;
   (e) computing permeability, capillary pressure, and saturation states in the first lower resolution 3D facies reconstruction on all the facies with physical properties from the one or more higher resolutions and the inter-resolution model;
   (f) iteratively validating computed permeability, capillary pressure, and saturation states when necessary; and
   (g) determining upscaled relative permeabilities from the first lower resolution 3D digital representation at each intermediate saturation state determined as in step (e) and permeabilities to the corresponding facies as in step (b) and (c).

14. The method of claim 13, further comprising:
   computing advanced physical properties, such as two-phase and three-phase relative permeabilities using basic properties, permeability and capillary pressure using steady state saturation approach;
   computing absolute permeabilities on each discretized saturation state from capillary pressure data; and
   deriving relative permeabilities by referencing saturation-specific absolute permeability to the single fluid absolute permeability of the complete pore space.

15. The method of claim 13, further comprising: determining upscaled saturation states of wetting and non-wetting fluid from one or multiple drainage and imbibition cycles with single wet and mixed wet conditions, using capillary pressure at the one or more higher resolutions, material phase segmentation at the first lower resolution, and an inter-resolution model.

16. The method of claim 13, further comprising: upscaling advanced physical properties, such as upscaled two-phase and three-phase relative permeabilities at the corresponding lower resolution using two-phase and three-phase relative permeabilities at the one or more higher resolutions, upscaled saturation states, material phase segmentation at the corresponding lower resolution, and an inter-resolution model.

17. The method of claim 13, further comprising: determining a necessity of an inter-resolution model, and determining the appropriate inter-resolution model.

18. The method of claim 17, further comprising: constructing an inter-resolution model comprising (a) Construction of an inter-resolution model as exemplified by a slot pore system in a rock sample; and (b) Classification of the inter-resolution models, using a distance-based method, a geometry-based, a random method, or other methods.

19. A system for computing two-phase and three-phase relative permeability from a porous material sample, comprising:
   (a) one or more imaging devices capable of producing two- or three-dimensional digital images of a porous material at one or more resolutions;
   (b) a first computer comprising at least one processor operable for executing a computer program capable of classifying elements in the two- or three-dimensional digital images as solid (grain) and pore (void);
   (c) a second computer comprising at least one processor operable executing a computer program capable of reconstructing three dimensional digital representations from two dimensional images or three dimensional images;
   (d) a third computer comprising at least one processor operable executing a computer program capable of performing computations of absolute permeability, capillary pressure, and two and three phase relative permeability at least one or multiple resolutions;
   (e) at least one storage device to store results of computations;
   (f) a program administrating computation resources, data, communication and all other relevant information including, but not limited to, date, time, analyst, log, and computing note; and
   (g) a user interface, either desktop-based or cloud-based, that allows a user to operate all of the above graphically to textually,
   wherein the second or the third computer can be same as or different from the first computer.

* * * * *